United States Patent [19]
Ohzawa

[11] Patent Number: 5,820,240
[45] Date of Patent: Oct. 13, 1998

[54] PROJECTION OPTICAL DEVICE

[75] Inventor: Soh Ohzawa, Toyonaka, Japan

[73] Assignee: Minolta Co., Ltd., Osaka, Japan

[21] Appl. No.: 668,162

[22] Filed: Jun. 21, 1996

[30] Foreign Application Priority Data

Jun. 22, 1995 [JP] Japan ..................... 7-155056
May 15, 1996 [JP] Japan ..................... 8-120104

[51] Int. Cl.$^6$ ................................. G03B 21/14
[52] U.S. Cl. ................................. 353/70; 353/101
[58] Field of Search ..................... 353/69, 70, 97; 359/100, 101, 662, 740, 798, 799, 800, 807

[56] References Cited

U.S. PATENT DOCUMENTS

| | | | |
|---|---|---|---|
| 4,089,599 | 5/1978 | Kuboshima | 353/70 |
| 5,032,022 | 7/1991 | Sato et al. | 353/70 |
| 5,096,288 | 3/1992 | Yano et al. | 353/69 |
| 5,220,363 | 6/1993 | Sato et al. | 353/70 |
| 5,302,983 | 4/1994 | Sato et al. | 353/70 |
| 5,422,691 | 6/1995 | Ninomiya et al. | 353/70 |
| 5,442,413 | 8/1995 | Tejima et al. | 353/70 |

FOREIGN PATENT DOCUMENTS

| | | |
|---|---|---|
| 3-084515 A | 4/1991 | Japan . |
| 3-113432 | 5/1991 | Japan . |
| 3-141337 A | 6/1991 | Japan . |
| 4-107521 | 4/1992 | Japan . |
| 5-100312 A | 4/1993 | Japan . |
| 5-134213 | 5/1993 | Japan . |

*Primary Examiner*—William Dowling
*Attorney, Agent, or Firm*—Burns, Doane, Swecker & Mathis, LLP

[57] ABSTRACT

A projection optical device includes a projection optical system for projecting an image of an object plane onto a screen without forming an intermediate real image. The projection optical system includes a coaxial first lens group to be arranged relatively near the object plane, a coaxial second lens group to be arranged relatively near the screen, and a stop arranged between the first and second lens groups. The second lens group has an optical axis inclined with respect to an optical axis of the first lens group. A magnification $\beta 1$ of the first lens group satisfies a relationship of $|1/\beta 1|<0.05$. The second lens group is angularly deviated from the first lens group around a position of the stop.

20 Claims, 15 Drawing Sheets

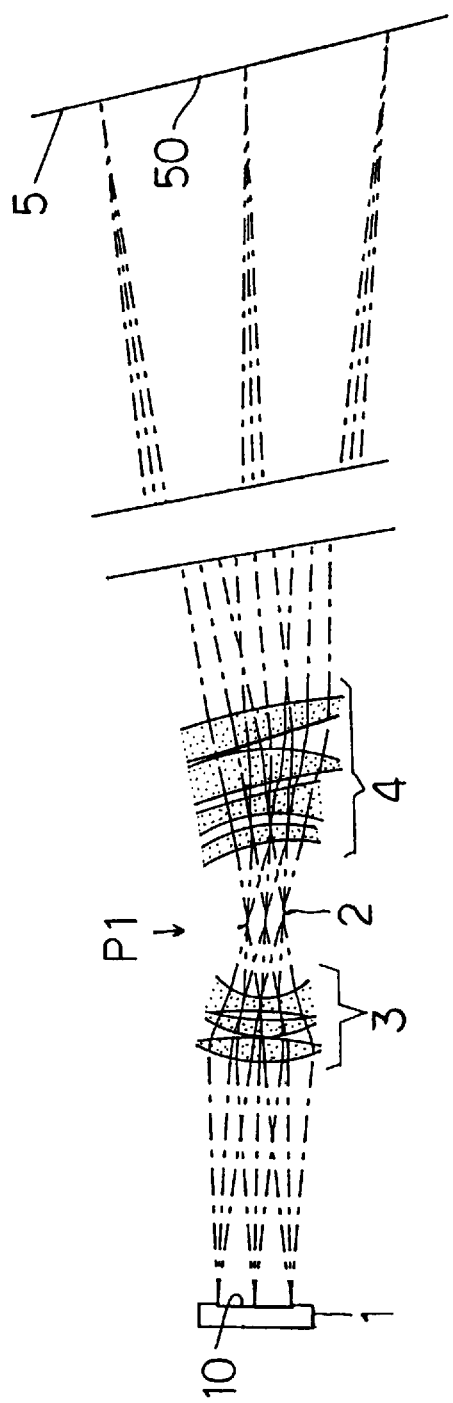

Ideal Image Plane Size
160.1 mm × 163.4 mm

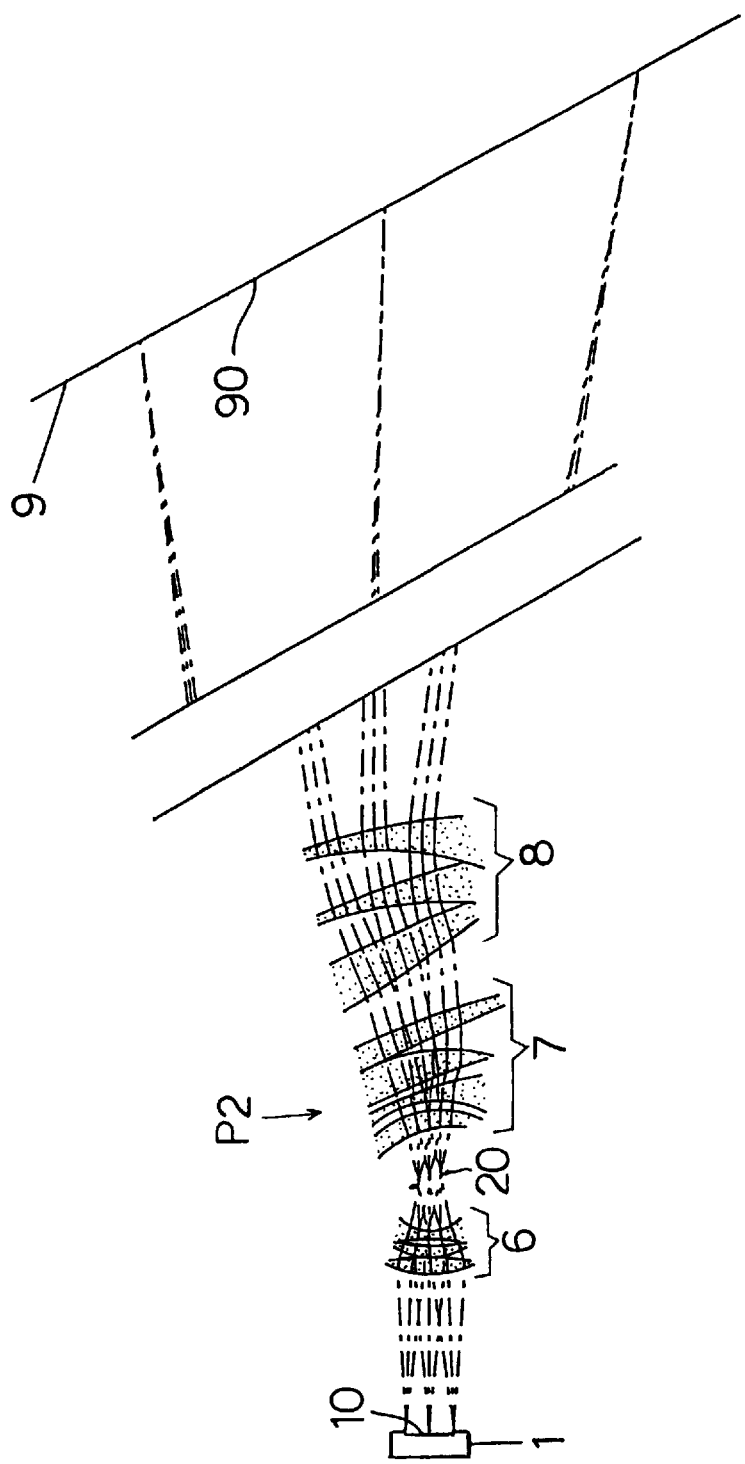

Ideal Image Plane Size
458.6 mm × 442.3 mm

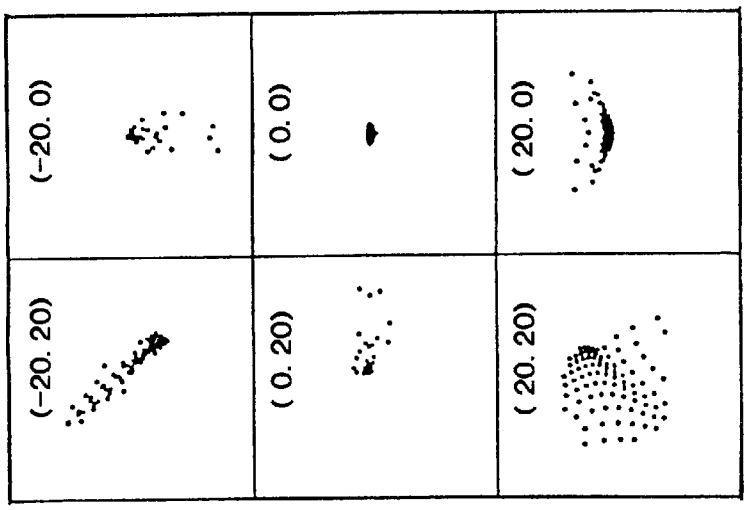
Fig.11(C) Inclination Angle of Image Plane 20°
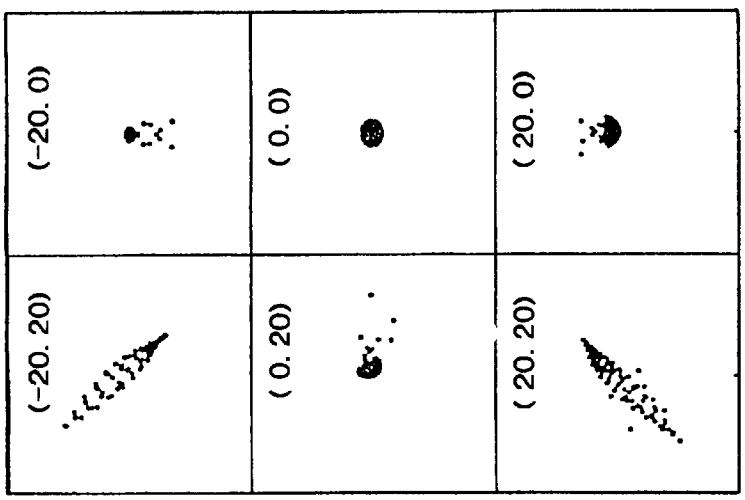
Fig.11(B) Inclination Angle of Image Plane 10°
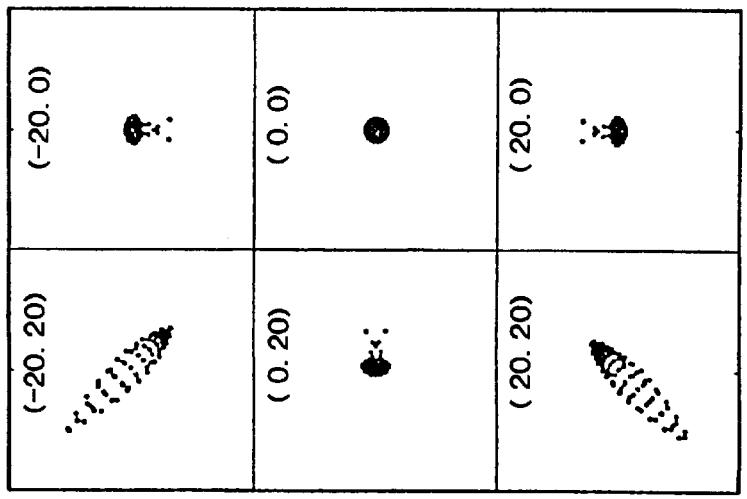
Fig.11(A) Inclination Angle of Image Plane 0°

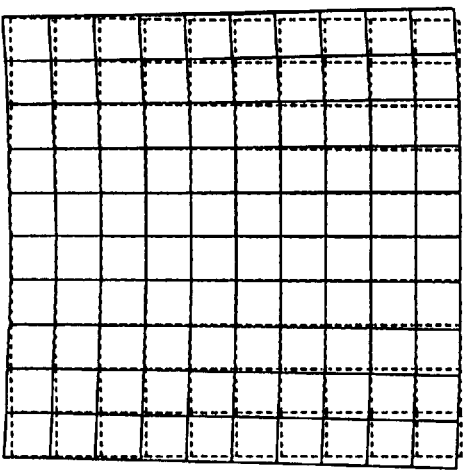
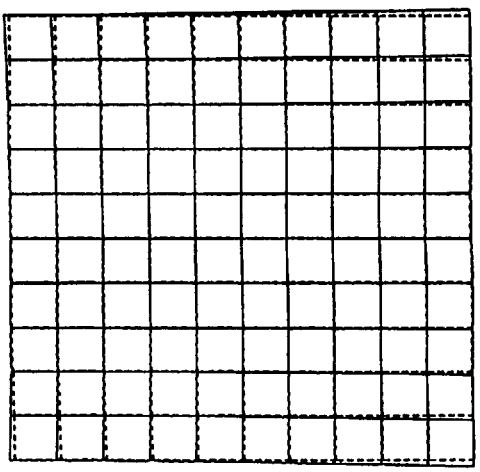
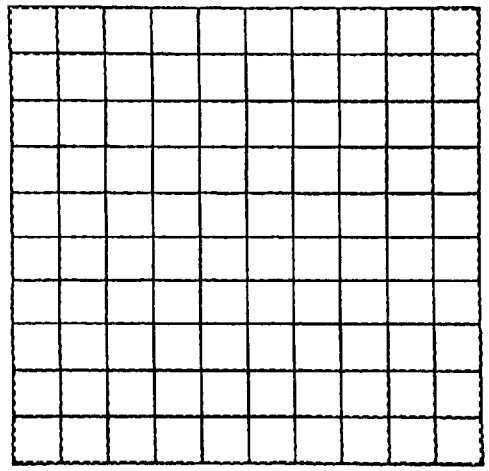

Inclination Angle 6.687°
of Image Plane

Inclination Angle 0°
of Image Plane

Ideal Image Plane Size
□ 425.20 mm

PROJECTION OPTICAL DEVICE

BACKGROUND OF THE INVENTION

1. Field of the Invention

The present invention relates to a projection optical device for projecting a magnified image of an object plane provided by a film image, a video image or the like onto a screen.

2. Description of the Background Art

Various kinds of projection optical devices have been developed for projecting magnified images of film images, video images or the like. In recent years, increase in size of screens have caused unpreferably increase in size of the devices. In view of this, a manner of projecting an image at an angle onto a screen has been proposed for suppressing increase in size of an optical system while increasing a size of a screen.

When an image is projected at an angle onto a screen, a so-called trapezoidal distortion occurs at the projected image. Many proposals have been made for correcting or compensating the distortion.

For example, Japanese Laid-Open Patent Publication No. 3-84515 (84515/1991) has proposed the following. An optical system for generating a trapezoidal distortion is interposed between a projection lens and an image display device. An image provided with an inverted trapezoidal distortion by the trapezoidal distortion generating optical system is once formed on an intermediate screen, and the image thus formed is projected at an angle onto a final screen by the projection lens, so that the trapezoidal distortion can be suppressed at the projected final image.

Japanese Laid-Open Patent Publication No. 3-113432 (113432/1991) has proposed the following. A projection lens is accompanied with a compensating optical system and a compensating optical system drive system. This compensating optical system is deviated with respect to an optical axis of the projection lens, for example, by deviating the same in a vertical direction while maintaining a parallel relationship so as to produce intentionally a decentered distortion aberration. Thereby, a trapezoidal distortion can be compensated.

Japanese Laid-Open Patent Publication No. 3-141337 (141337/1991) has disclosed the following. Means for driving and deviating some of lenses in a projection lens system is arranged. This drive means drives and deviates at least two of lenses among the projection lenses to produce a decentered distortion aberration. Thereby, it is possible to compensate a trapezoidal distortion and an origin displacement in an image on a final screen.

Japanese Laid-Open Patent Publication No. 5-100312 (100312/1993) has disclosed the following. A light bulb for displaying an image by a liquid crystal or the like is arranged parallel to a screen. The light bulb and the screen are shifted oppositely to each other with respect to an optical axis of a projection optical system. The projection lens is formed of a wide angle lens, i.e., lens having a wide field angle. By using a part of the field angle of the wide angle lens, a distortion is not produced at a projected image.

However, all the projection optical devices of the publications described above suffer from specific or practical problems.

For example, Japanese Laid-Open Patent Publication No. 3-84515 has not disclosed a specific structure and numerical data for the trapezoidal distortion generating system. An image containing an inverted trapezoidal distortion applied by the trapezoidal distortion generating optical system is once formed on an intermediate screen, and the image thus formed is projected at an angle onto the final screen through the projection lens. This intermediate screen increases a loss of the quantity of light and a cost.

According to Japanese Laid-Open Patent Publication No. 3-113432, only third or lower terms and regions of the decentered distortion aberration, which is caused by driving and deviating the compensation optical system, are taken into consideration for compensating the distortion aberration, and compensation of the aberration other than the above is not disclosed. Therefore, it is difficult to compensate sufficiently the aberration.

According to Japanese Laid-Open Patent Publication No. 3-141337, at least two of the projection lenses are driven and deviated to produce the decentered distortion aberration for compensating the trapezoidal distortion in the image on the final screen. The parallel deviation of the two lenses disclosed as an embodiment in this reference cannot sufficiently remove the aberration, so that it is difficult to satisfy a practical demand.

According to the optical systems disclosed in Japanese Laid-Open Patent Publication Nos. 3-113432 and 3-141337, it is proposed to cancel and compensate a paraxially generated trapezoidal distortion by a decentered distortion aberration. However, the trapezoidal distortions disclosed in these publications are proportional to an object height H, and the decentered distortion aberration is in proportion to the square of H. In a region of a large angle of tilt-projection, therefore, it is difficult to compensate the trapezoidal distortion throughout the screen when the field angle of the lens is large.

According to Japanese Laid-Open Patent Publication No. 5-100312, only a part of the field angle of the projection lens is used for projecting an image onto the screen. Therefore, a cost is high, and the image plane cannot be inclined at a large angle when the field angle of image projection is wide. A wide angle lens having a very large field angle is required, resulting in a dark lens having a small F-number.

The tilt-projection optical devices disclosed in the foregoing references utilize deviation of the lens for compensating the trapezoidal distortion caused by tilt-projection, but can compensate the aberration only at the positions of the object plane, image plane and deviated lens group. In the projection optical devices such as a tilt-projection optical device, however, it may be necessary to change an angle of inclination of the image plane and/or object plane when adjusting the device in the manufacturing process thereof. In the projection optical device employing a variable angle screen, it may be necessary to change the tilt angle of the image plane and/or object plane in accordance with change of the tilt angle of the screen. In such projection optical devices in the prior art, and particularly when the angles of the image plane and object plane are to be changed without substantially changing the degree of compensation of the image distortion and the image magnification, it may be necessary to perform complicated motion such as turn and/or parallel displacement of a plurality of optical blocks in the optical device. This complicates motion mechanisms. Also, aberration compensation may be difficult because an optical block is to be moved to a large extent. Further, the whole optical device has large sizes, and require an excessively high cost. Increase in size of the device is not accepted because reduction in size and cost of the whole projection optical device including a screen have been recently required.

SUMMARY OF THE INVENTION

Accordingly, an object of the invention is to provide a projection optical device, which is operable to project a magnified image of an object plane provided by a film image, a video image or the like onto a screen, and can sufficiently compensate a trapezoidal distortion and a distortion aberration in a projected image.

Another object of the invention is to provide a projection optical device, which is operable to project an image of an object plane provided by a film image, a video image or the like onto a screen, and can make turn of the object plane or the image plane while maintaining a constant situation of aberration compensation of a final image.

Still another object of the invention is to provide a practical projection optical device which is low in cost and has a compact structure.

The present invention provides a projection optical device (first projection optical device) including a projection optical system for projecting an image of an object plane onto a screen without forming an intermediate real image, wherein the projection optical system includes a coaxial first lens group to be arranged relatively near the object plane, a coaxial second lens group to be arranged relatively near the screen, and a stop arranged between the first and second lens groups, the second lens group has an optical axis inclined with respect to an optical axis of the first lens group, and a magnification $\beta 1$ of the first lens group satisfies a relationship of $|1/\beta 1|<0.05$.

Here, said "magnification $\beta 1$ of the first lens group" means a paraxial magnification determined by a Scheimpflug condition with respect to a center of the object plane.

According to the projection optical device of the invention, the first lens group is arranged relatively near the object plane provided by the film image, video image or the like, and the object plane is magnified and projected onto the screen. The projection optical system in this optical device has the deviated lens groups, and is designed not to form an image other than the final image plane. This structure allows reduction in a total length of the projection optical system, and therefore can reduce the sizes of the whole device.

Since the paraxial magnification $\beta 1$ of the coaxial lens group (first lens group) relatively near the object plane and adjacent to the stop, which is determined by the Scheimpflug condition with respect to the object plane center, satisfies a relationship of $|1/\beta 1|<0.05$, and both the first and second lens groups near the stop are deviated from each other, relative deviation of both the lens groups adjacent to the stop turns the image plane at a portion in which substantially parallel light rays are formed with respect to the stop. Since the lens groups at the opposite sides of the stop are deviated from each other with respect to the substantially parallel light rays, aberration compensation nearly equivalent to aberration compensation at a coaxial system is partially effected, and practical and intended aberration compensation (i.e., compensation of comatic aberration, trapezoidal distortion and distortion aberration) for the final projected image is performed with a reduced number of lenses.

Since the aberration compensation can be sufficiently performed with a reduced number of lenses and without employing an additional optical system for the projection optical system required in the prior art, the whole device can be manufactured at a low cost.

The magnification $\beta 1$ (magnification determined by the Scheimpflug condition with respect to the object plane center) of the first lens group between the stop and the object plane will be further discussed below. As already discussed, it is desirable to satisfy the relationship of $|1/\beta 1|<0.05$. This is because that, if the above relationship were not satisfied, rays passing through the stop would be liable to be converging or divergent rays causing significant deviation with respect to the parallel rays. Therefore, an intermediate image plane would be formed at a position closer to the second lens group relatively near the screen. In this case, by turning the image plane by the deviated lens groups, an intermediate image plane which was inclined toward the second lens group between the stop and the screen would be projected onto the screen. This would require an increased number of lenses for aberration compensation, and therefore would increase a total length of the projection optical system.

Further, the invention provides a projection optical device (second projection optical device) including a projection optical system for projecting an image of an object plane onto a screen, wherein the projection optical system includes at least one lens group to be arranged relatively near the object plane, at least one lens group to be arranged relatively near the screen, and a stop arranged between the lens groups relatively near the object plane and the screen, a part of the lens groups relatively near the object plane and the screen is angularly deviatable, and the angularly deviatable lens group is operable to turn for turning one of an image plane and the object plane while maintaining a constant distortion of the image plane.

According to this projection optical device, the object plane or image plane can be easily turned by simply turning an optical block including the angularly deviatable lens group provided for turning the object or image plane while maintaining a constant situation of aberration compensation and a constant image magnification.

Any of the projection optical devices of the invention described above may include information providing means for providing the object plane with information, and a screen onto which the information provided by the means is projected.

The foregoing and other objects, features, aspects and advantages of the present invention will become more apparent from the following detailed description of the present invention and the accompanying drawings.

BRIEF DESCRIPTION OF THE DRAWINGS

FIG. 2 shows a schematic structure of the projection optical device having the projection optical system shown in FIG. 1 and a light path in the same;

FIG. 6 shows a schematic structure of the projection optical device having the projection optical system shown in FIG. 5 and a light path in the same;

FIGS. 11(A), 11(B) and 11(C) show spots at an image plane on a screen which are defined by rays from an object point on an object plane in the device shown in FIGS. 10(A), 10(B) and 10(C), and particularly show cases in which an inclination angle of an image plane is 0°, 10° and 20°, respectively;

FIGS. 12(A), 12(B) and 12(C) each show a projected image with a distortion of a square object plane (grid pattern) on a screen (which is represented by solid line) and an ideal image without a distortion (which is represented by broken line), and particularly show cases in which an inclination angle of an image plane is 0°, 10° and 20°, respectively;

DESCRIPTION OF THE PREFERRED EMBODIMENTS

Figure 1:
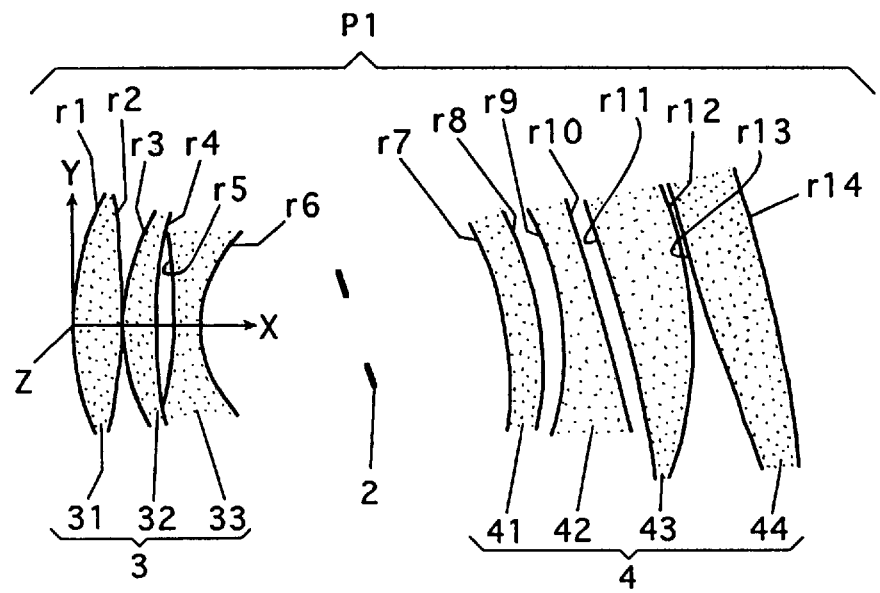
FIG. 1 is a cross section showing lens groups in a projection optical system of a projection optical device according to the invention.

The first projection optical device according to the invention already described, in which a magnification $\beta1$ of a first lens group satisfies a relationship of $|1/\beta1|<0.05$, may selectively have structures of the following forms (1)–(4):

(1) A projection optical device in which the stop is located at a focus position of the first lens group, and a telecentric system is formed at the object plane side of the first lens group.

According to the above structure in which the stop is located at the focus position of the first lens group relatively near the object plane, and the telecentric system is formed at the object plane side of the this lens group, an angle of incident rays to the first lens group from each point on the object plane (e.g., each pixel on image screen of a liquid crystal display or the like) is constant, so that this structure can be applied to a color composition optical system attained with dichroic mirrors or liquid crystal display elements having light transmission characteristics which change depending on an angle of rays.

(2) A projection optical device in which the second lens group is angularly deviated around the stop.

The second lens group may be angularly deviatable around the stop, for example, continuously.

In the case where substantially parallel rays are supplied to the stop, and the lens groups at the opposite sides of the stop are angularly deviated or deviatable around the stop, intermediate image planes for the lens groups at the opposite sides of the stop are located at substantially infinity, when viewed from the stop. Therefore, turning does not destroy the symmetry, and further, the image plane can be turned, so that design can be further similar to that of the coaxial system, and thus aberration compensation can be done with a reduced number of lenses in spite of the fact that the structure is of a deviatable type. Although the decenterd optical system in the prior art requires complicated motion of the lens groups for turning the image plane, employment of the foregoing projection optical system of the invention can turn the image plane while maintaining a good imaging relationship during angular deviation, so that the image plane can be turned by simply turning the lens group.

(3) A projection optical device in which at least one of the first and the second lens groups is formed of a lens group having f-θ characteristics viewed from the stop side.

The lens group having the f-θ characteristics is the same as that generally called a "fθ lens" and has such a feature that an image height is proportional to a light incident angle θ. The above "f" means a focal length.

By the above structure in which at least one of the lens groups at the opposite sides of the stop has the f-θ characteristics when viewed from the stop side, the f-θ lens group establishes a proportional relationship between the light incident angle and the image height at the stop side. Therefore, even when an angle of the rays at the stop side changes, a relationship of the image height corresponding to the same does not change. This allows turn of the image plane by simple motion of the lens group, i.e., by turning the f-θ lens system around the stop, while maintaining conditions of compensating the aberration such as the trapezoidal distortion, the curvature of field and the comatic aberration.

(4) A projection optical device in which the projection optical system has a third lens group to be arranged between the second lens group and the screen, the third lens group partially contains a coaxial lens group, and an angle θ between an optical axis of this partial lens group and an image plane satisfies the following relationship:

$|\theta|<5°$

For increasing the field angle, the projection optical device of the invention can effectively employ the third lens group, which is located between the second lens group and the image plane, and partially includes the coaxial lens group. The trapezoidal distortion due to this lens group can be prevented by setting the angle θ between the optical axis of this partial lens group and the final image plane to satisfy the above relationship.

If the above relationship of $|\theta|<5°$ were not satisfied, the lens group causes a large trapezoidal distortion, and it is difficult to compensate this distortion by the lens groups preceding this lens group.

FIGS. 1 to 4 relate to a specific example of a projection optical device of the invention. FIG. 1 is a cross section of lens groups in a projection optical system of a projection optical device. FIG. 2 shows a schematic structure of the projection optical device having the projection optical system and a light path in this structure.

The device includes an image display device 1 which provides an object plane 10 to be magnified and projected, a projection optical system P1 and a screen 5 on which a final image plane 50 is to be formed.

The object plane 10 in this embodiment is a square object plane (grid pattern) having sides, each of which is 40 mm in length.

The projection optical system P1 includes a stop 2 as well as lens groups 3 and 4 arranged at opposite sides of the stop 2.

The lens group 3 near the object plane has a focal point located at the same position as the stop 2, so that a telecentric system is formed at the object plane side.

The lens group 3 between the object plane and the stop 2 is a coaxial lens group formed of lenses 31, 32 and 33 which exhibit f-θ characteristics as a whole.

The lens group 4 between the stop 2 and the screen 5 is a coaxial lens group formed of lenses 41, 42, 43 and 44 which exhibit f-θ characteristics as a whole.

With respect to the f-θ lens group 3 near the object plane, a position (will be referred to as an "object height") of an object point in the object plane 10 on the image display device 1 is proportional to an outgoing angle (i.e., an angle between the outgoing ray and the optical axis of the lens group 3) at the stop side. With respect to the f-θ lens group 4 relatively near the image plane, a position of an image point in the final image plane 50 (will be referred to as an "image height" hereinafter) is proportional to an incident angle (an angle of the incident ray to the optical axis of the lens group 4). The lens group 4 is located at a position which is angularly deviated by a predetermined angle around a center of the incident rays, so that the final image plane 50 can be turned or inclined. Thus, the lens group 4 is angularly deviated around an axis, which is parallel to a Z-axis to be described later and extends through an intersection between a plane containing the stop 2 and the optical axis of the lens group 4 (here, the center of the stop 2 because the aperture of the stop is circular).

A magnification β1 of the lens group 3 relatively near the object plane satisfies a relationship of $|1/\beta 1|=8.446\times 10^{-5}<0.05$.

Specifications of the lens groups 3 and 4 as well as the object plane 10 and the image plane 50 are shown in a table 1. In the table 1, "r1 . . . r6, r7 . . . r14" represent the lens surfaces of lenses 31–33 and 41–44" as shown in FIG. 1, and "radius of curvature" represents radii (mm) of curvatures of the respective lens surfaces. In this table, with respect to the radius of curvature, a convex surface in a light advancing direction is represented by a "positive value", and a concave surface is represented by a "negative value". The "axial distance" represents distances (mm) along the optical axis between adjacent lens surfaces as well as between the lens surface and the stop. The "refractive index" represents refractive indexes of substances between the adjacent lens surfaces (or substance behind the final lens surfaces) as well as between the lens surface and the stop. The refractive index of 1.00000 represents that no lens exists and the substance is air.

The stop has an infinite radius of curvature (∞), which is also represented in the table 1 together with the radius (mm) of the aperture of the stop.

In the table 1, numerical values of X, Y and Z in sections of "Lens Group 3", "Lens Group 4", "Object Plane 10" and "Image Plane 50" represent coordinate positions (X, Y, Z). More specifically, the numerical values of X, Y and Z in the sections of "Lens Group 3" and "Lens Group 4" represent the positions of the surface apex (vertex) of the lens surface r1 nearest to the object plane as well as the center of the stop 2. The values X,Y and Z in the sections of "Object Plane 10" and "Image Plane 50" represent the positions of the centers of the object plane 10 and image plane 50, respectively. In this embodiment as well as other embodiments to be described later, the X-axis in (X, Y, Z) coordinate extends along an optical axis (positive in the light advancing direction) of the lens nearest to the object plane from the surface apex of the same lens (e.g., the apex of the surface r1 of the lens 31 in FIG. 1). The Y-axis is a longitudinal axis perpendicular to the X-axis. The Z-axis is perpendicular to both the X- and Y-axes (here, to a sheet of the drawing). The "ANG" represents angles (degrees) of angular deviation of the lens group 3, the stop 2 and the lens group 4 with respect to the X-axis, and also represents inclination angles of the object plane and image plane with respect to the X-axis. Throughout the table, "positive" represents a clockwise direction in the figure.

In the section of the object plane, ymax and ymin represent areas of the object plane in the Y-axis direction, and zmax and zmin represent areas of the object plane in the Z-axis direction.

TABLE 1

| | Lens Group 3 | | | |
|---|---|---|---|---|
| | X | Y | Z | ANG |
| | 0.00000 | 0.00000 | 0.00000 | 0.00000 |
| | radius of curvature | | axial distance | refractive index |
| r1 | 80.622 | | | |
| | | | 12.702 | 1.76500 |
| r2 | −207.716 | | | |
| | | | 0.544 | 1.00000 |
| r3 | 57.486 | | | |
| | | | 9.073 | 1.76500 |
| r4 | 137.219 | | | |
| | | | 4.536 | 1.00000 |
| r5 | −227.078 | | | |
| | | | 7.349 | 1.51100 |
| r6 | 33.679 | | | |
| | | | 0.000 | 1.00000 |
| | Lens Group 4 | | | |
| | X | Y | Z | ANG |
| | 77.754 | 0.00000 | 0.00000 | −20.0000 |
| | radius of curvature | | axial distance | refractive index |
| Stop 2 | ∞ (radius of aperture of stop 10.000 ) | | | |
| | | | 39.982 | 1.00000 |
| r7 | −90.695 | | | |
| | | | 9.796 | 1.75600 |
| r8 | −82.199 | | | |
| | | | 6.357 | 1.00000 |
| r9 | −77.101 | | | |
| | | | 9.596 | 1.75600 |
| r10 | −469.473 | | | |
| | | | 4.878 | 1.00000 |
| r11 | −415.372 | | | |
| | | | 20.991 | 1.75600 |
| r12 | −107.691 | | | |
| | | | 1.639 | 1.00000 |
| r13 | 2557.741 | | | |
| | | | 18.751 | 1.75600 |
| r14 | −349.002 | | | |
| | | | 0.000 | 1.00000 |

TABLE 1-continued

Object Plane 10

| X | Y | Z | ANG | |
|---|---|---|---|---|
| −129.700 | 0.00000 | 0.00000 | 0.00000 | |
| | ymax | ymin | zmax | zmin |
| | 20.0000 | −20.0000 | 20.0000 | −20.0000 |

Image Plane 50

| X | Y | Z | ANG |
|---|---|---|---|
| 694.049 | 75.7223 | 0.000 | −20.0000 |

The following table 2 represents distortion ratios at the final image plane 50.

In the following table 2, the "Object Height" represents distances (mm) in the Y-axis direction and Z-axis direction to the object point from the origin defined by a point at which the X-axis intersects the object plane 10. The "image height" is determined as follows. The origin is defined by a point at which a ray from the object plane center (0, 0) intersects the image plane 50. Line at which X-Y plane intersects the image plane 50 is defined as a y-axis (a direction of the Y-axis positive direction projected on the image plane 50 represents the positive direction). An axis perpendicular to the y-axis is defined as a z-axis (the front side of the sheet of the drawing represents a positive area). Based on the above definition, the "image height" is determined on the (y, z) coordinate. An ideal image height is represented as (y, z). The image height including a distortion is represented as (y+dy, z+dz). dy/r represents a distortion ratio in the y-axis direction, and dz/r represents a distortion ratio in the z-axis direction. "r" can be represented as $r=(y^2+z^2)^{1/2}$. The image height having the distortion which is used for obtaining the distortion ratio is determined by center-of-gravity points in spot diagrams for respective image heights.

Figure 3:
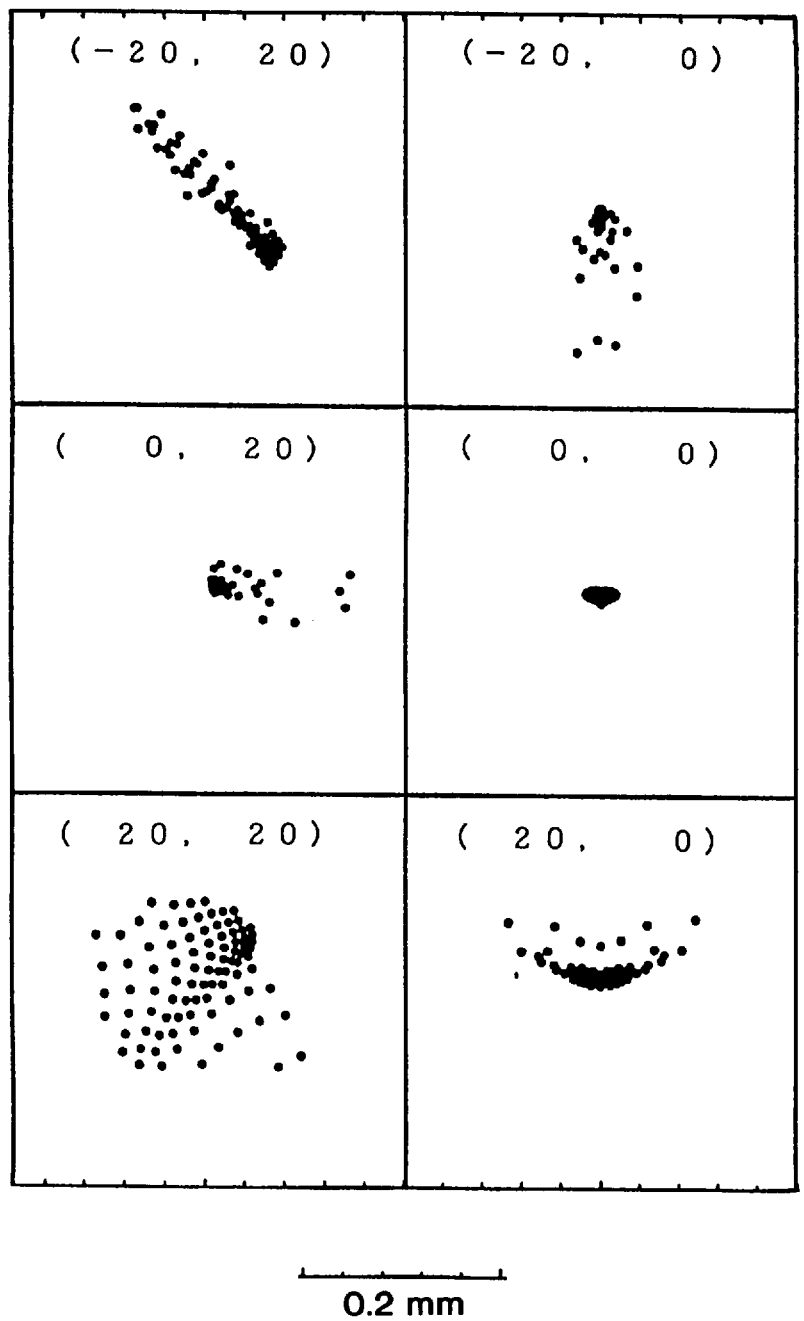
FIG. 3 shows spots at an image plane on a screen which are defined by rays from an object point on an object plane in the device shown in FIG. 2.

The spot diagrams for object points of the respective object heights are shown in FIG. 3. A projected image on the screen 5 is shown in FIG. 4.

TABLE 2

| | Distortion Ratio | |
|---|---|---|
| Object Height | dy/r | dz/r |
| (20, 0) | 0.0008 | 0.0000 |
| (−20, 0) | 0.0046 | 0.0000 |
| (20, 20) | 0.0162 | −0.0224 |
| (0, 20) | 0.0235 | −0.0042 |
| (−20, 20) | 0.0234 | 0.0101 |

Figure 4:
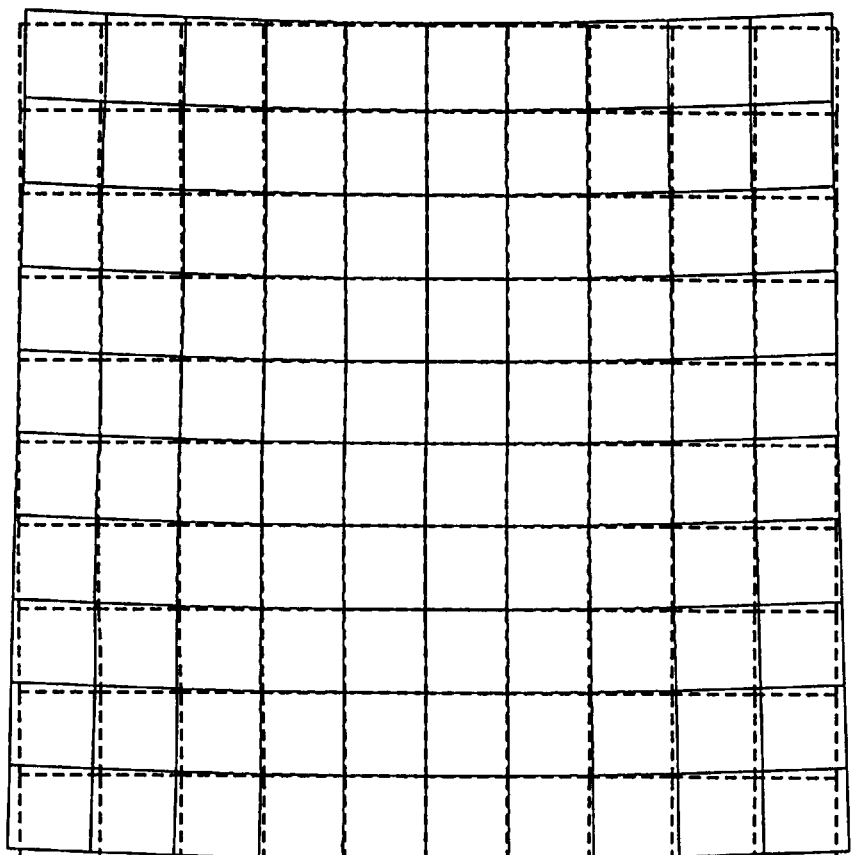
FIG. 4 shows a projected image with a distortion of a square object plane (grid pattern) on a screen (which is represented by solid line) and an ideal image without a distortion (which is represented by broken line)

From the distortion ratios and FIG. 4, it can be understood that the projection optical device can provide a final projected image in which the trapezoidal distortion and distortion aberration are sufficiently compensated.

Another embodiment of the device of the invention will be described below with reference to FIGS. 5 to 8.

Figure 5:
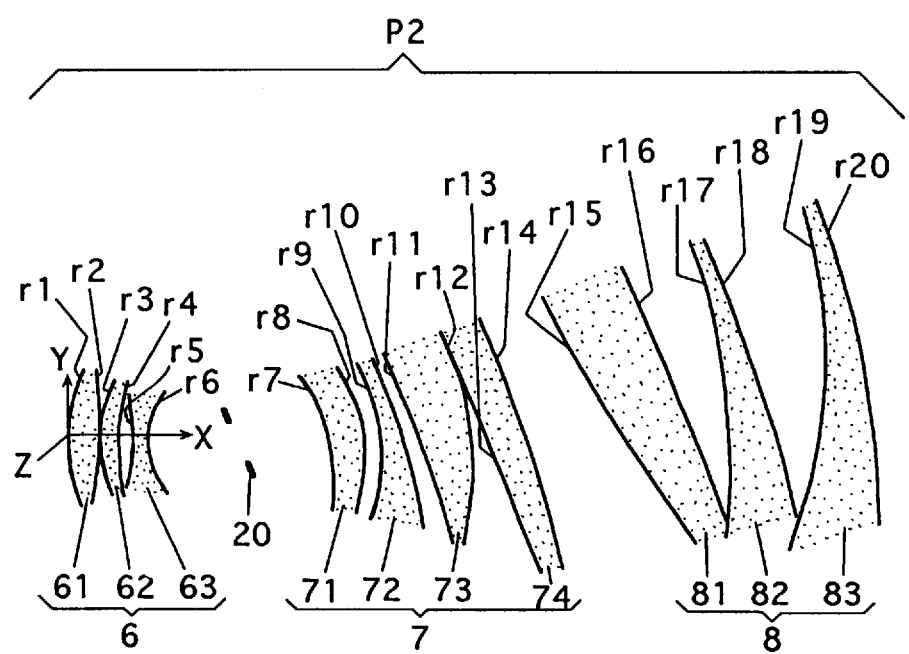
FIG. 5 is a cross section showing lens groups in a projection optical system of a projection optical device according to another embodiment of the invention.

FIG. 5 is a cross section showing lens groups in a projection optical system of a projection optical device, and FIG. 6 shows a schematic structure of the projection optical device having the projection optical system and a light path in the same.

Similarly to the embodiment already described, the device of this embodiment includes the image display device 1 which provides the object plane 10 to be magnified and projected, a projection optical system P2 and a screen 9 on which a final image plane 90 is to be formed.

The object plane 10 is a square object plane (grid pattern) having sides, each of which is 40 mm in length. The projection optical system P2 includes a stop 20 as well as lens groups 6 and 7 arranged at opposite sides of the stop 20, and further includes a lens group 8 arranged between the lens group 7 and the screen 9.

The lens group 6 relatively near the object plane 10 has a focal point located at the same position as the stop 20, so that a telecentric system is formed at the object plane side.

The lens group 6 is a coaxial positive lens group formed of lenses 61, 62 and 63. The lens group 7 is a coaxial positive lens group formed of lenses 71, 72, 73 and 74. The lens group 8 is a coaxial negative lens group formed of lenses 81, 82 and 83.

The positive lens group 6, the stop 20 and the positive lens group 7 have the same functions as those of the projection optical system P1 in the device of the embodiment already described. The negative lens group 8 functions to reduce a focal length of the whole projection optical system and increase a field angle thereof, and thereby functions to magnify the image at the object plane side to be projected to a higher extent.

The lens group 7 is angularly deviated around an axis, which is parallel to the Z-axis and extends through an intersection between a plane containing the stop 20 and the optical axis of the lens group 7 (here, the center of the stop 20 because the aperture of the stop is circular). In the lens group 8, a lens surface (here, the lens surface r15 in FIG. 5) nearest to the object plane has a surface apex (vertex) located at a position represented by (X, Y) in a table 3. The lens group 8 is angularly deviated around an axis, which extends through the above surface apex and is parallel to the Z-axis.

A magnification β1 of the lens group 6 near the object plane satisfies a relationship of |β1|=0.01617<0.05.

An angle θ1 between the symmetry axis of the lens group 8 and the image plane 90 satisfies a relationship of |θ1|= 1.02°.

Specifications of the lens groups 6, 7 and 8 as well as the object plane 10 and the image plane 90 are shown in the table 3 similar to the table 1.

In the table 3, "r1 . . . r6, r7 . . . r14, r15 . . . r20" represent the lens surfaces of lenses 61–63, 71–74 and 81–83" as shown in FIG. 5. The stop 20 has an infinite radius of curvature (∞), which is also represented in the table 3 together with the radius (mm) of the aperture of the stop 20.

In the table 3, numerical values of X, Y and Z in sections of "Lens Group 6, 7 and 8", "Object Plane 10", and "Image Plane 90" represent coordinate positions (X, Y, Z) of surface apexes of the surfaces r1 and r15 of the lenses 61 and 81 in the lens groups 6 and 8 and a center of the stop 20, and also represent coordinate positions (X, Y, Z) of centers of the object plane 10 and image plane 90. The "ANG" represents angles (degrees) of angular deviation of the lens group 6, the stop 20, the lens group 7 and the lens group 8 with respect to the X-axis, and also represents inclination angles of the object plane and image plane with respect to the X-axis.

TABLE 3

| | Lens Group 6 | | | |
|---|---|---|---|---|
| | X | Y | Z | ANG |
| | 0.00000 | 0.00000 | 0.00000 | 0.00000 |
| | radius of curvature | | axial distance | refractive index |
| r1 | 81.587 | | | |
| | | | 14.000 | 1.76500 |
| r2 | −250.903 | | | |
| | | | 0.544 | 1.00000 |

TABLE 3-continued

| r3 | 57.758 | | | | |
|---|---|---|---|---|---|
| | | | | 9.073 | 1.76500 |
| r4 | 145.925 | | | | |
| | | | | 5.500 | 1.00000 |
| r5 | −256.377 | | | | |
| | | | | 7.000 | 1.51100 |
| r6 | 34.413 | | | | |
| | | | | 0.000 | 1.00000 |

Lens Group 7

| | X | Y | Z | ANG | |
|---|---|---|---|---|---|
| | 77.754 | 0.00000 | 0.00000 | −24.1416 | |
| | radius of curvature | | | axial distance | refractive index |
| Stop 20 | ∞ (radius of aperture of stop 10.000 ) | | | | |
| | | | | 39.982 | 1.00000 |
| r7 | −91.615 | | | | |
| | | | | 17.000 | 1.75600 |
| r8 | −77.144 | | | | |
| | | | | 8.000 | 1.00000 |
| r9 | −81.360 | | | | |
| | | | | 7.000 | 1.75600 |
| r10 | −287.720 | | | | |
| | | | | 5.500 | 1.00000 |
| r11 | −720.238 | | | | |
| | | | | 28.000 | 1.75600 |
| r12 | −138.861 | | | | |
| | | | | 1.000 | 1.00000 |
| r13 | −11058.974 | | | | |
| | | | | 18.752 | 1.75600 |
| r14 | −682.976 | | | | |
| | | | | 0.000 | 1.00000 |

Lens Group 8

| | X | Y | Z | ANG | |
|---|---|---|---|---|---|
| | 203.843 | 93.500 | 0.000 | −28.9808 | |
| | radius of curvature | | | axial distance | refractive index |
| r15 | 113.216 | | | | |
| | | | | 40.000 | 1.70000 |
| r16 | −1003.868 | | | | |
| | | | | 35.000 | 1.00000 |
| r17 | −291.840 | | | | |
| | | | | 5.000 | 1.70000 |
| r18 | −672.984 | | | | |
| | | | | 50.000 | 1.00000 |
| r19 | −244.213 | | | | |
| | | | | 5.000 | 1.70000 |
| r20 | −423.573 | | | | |
| | | | | 0.000 | 1.00000 |

Object Plane 10

| X | Y | Z | ANG |
|---|---|---|---|
| −128.500 | 0.00000 | 0.00000 | 0.00000 |
| | ymax | ymin | zmax | zmin |
| | 20.0000 | −20.0000 | 20.0000 | −20.0000 |

Image Plane 90

| X | Y | Z | ANG |
|---|---|---|---|
| 1411.810 | 48.829 | 0.000 | −30.0000 |

The following table 4 represents distortion ratios at the final image plane 90.

Figure 7:
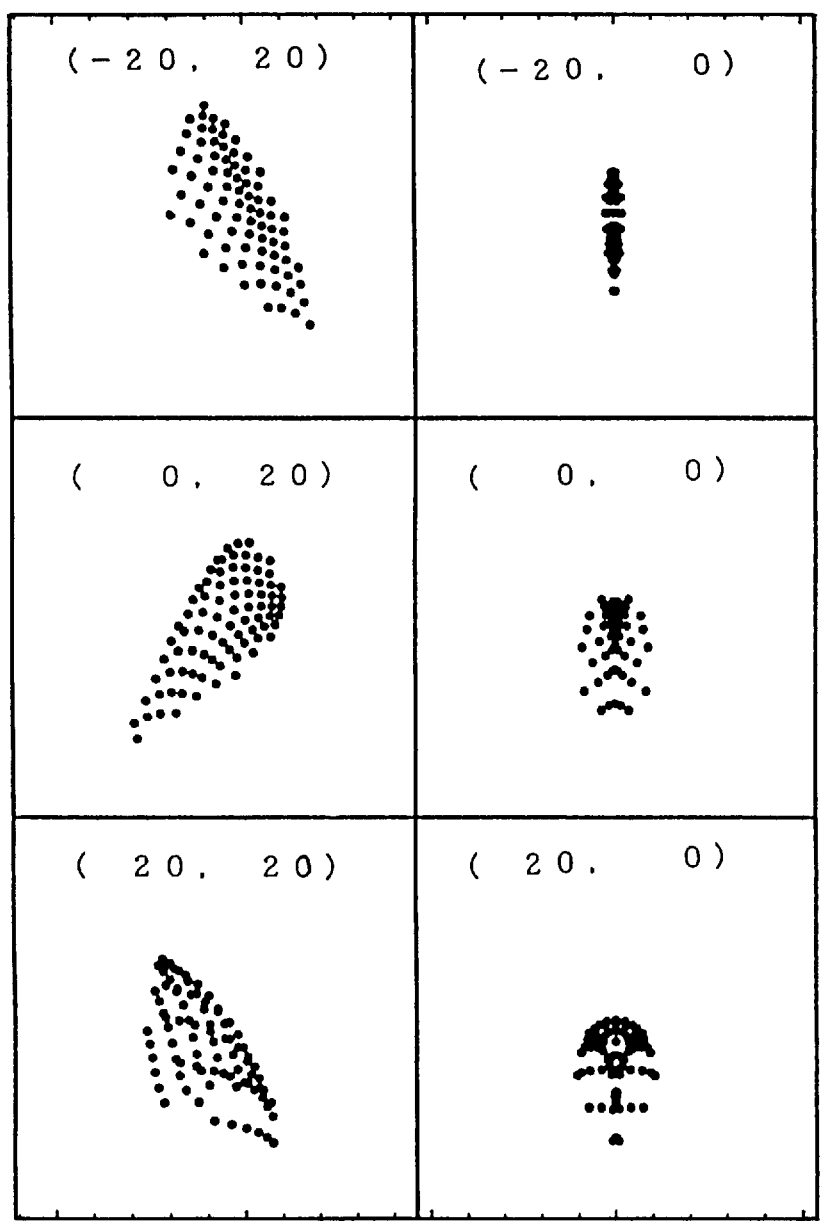
FIG. 7 shows spots at an image plane on a screen which are defined by rays from an object point on an object plane in the device shown in FIG. 6.
Figure 8:
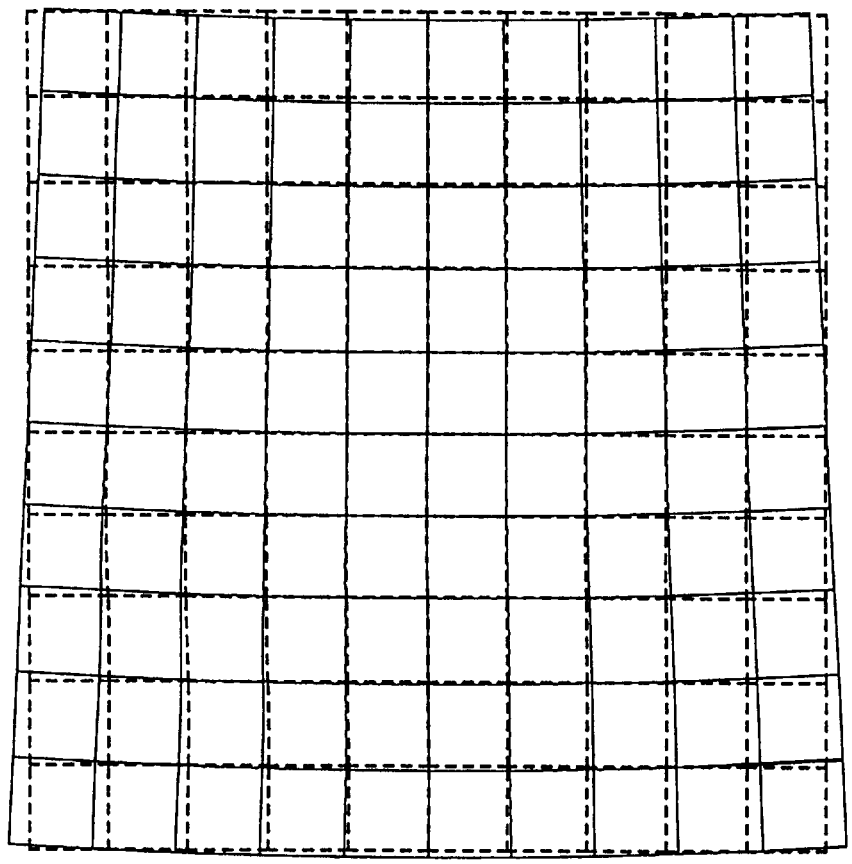
FIG. 8 shows a projected image with a distortion of a square object plane (grid pattern) on a screen (which is represented by solid line) and an ideal image without a distortion (which is represented by broken line)

The spot diagrams for object points of the respective object heights are shown in FIG. 7. A projected image on the screen 9 is shown in FIG. 8.

TABLE 4

| | Distortion Ratio | |
|---|---|---|
| Object Height | dy/r | dz/r |
| (20, 0) | −0.0164 | 0.0000 |
| (−20, 0) | −0.0196 | 0.0000 |
| (20, 20) | 0.0088 | −0.0356 |

TABLE 4-continued

| | Distortion Ratio | |
|---|---|---|
| Object Height | dy/r | dz/r |
| (0, 20) | 0.0263 | 0.0022 |
| (−20, 20) | 0.0041 | 0.0305 |

From the distortion ratios and FIG. 8, it can be understood that the projection optical device can provide a final projected image in which the trapezoidal distortion and distortion aberration are sufficiently compensated.

Description will now be given on the second projection optical device of the invention already mentioned, which can rotate either the image plane or the object plane while maintaining the distortion of the image plane constant.

The angularly deviatable lens group already described may be either a lens group turning the object plane or a lens group turning the image plane. When the lens group turns the image plane, the center of turn can be located at a position of the image of the stop viewed from the angularly deviatable lens group. According to this structure, symmetric points of respective rays on and off the optical axis form the apparent stop position, so that the distortion of the image due to turn of the image plane can be suppressed.

The lens group for turning the image plane may be the lens group adjacent to the stop, and may have a center of turn located substantially at the position of the stop. This structure can reduce a difference in height between the ray on the optical axis and the ray off the optical axis, and can reduce a required effective diameter of the lens group for turning the image plane, so that the projection optical device can have a compact structure.

In any case, when the angularly deviatable lens group is employed as the lens group for turning the image plane, the lens group may have the f-θ characteristics. This establishes a proportional relationship between the incident angle of rays to the lens group and the image height, so that the image plane formed by the rays which passed through the lens group of turning the image plane is turned, and all the image points move a constant distance in accordance with change in the incident angle of rays to the lens group having the f-θ characteristics. Relative positions between the respective image points are constant. Therefore, the image plane turns without change in distortion of the image.

Both the lens groups relatively near the object plane and the image plane may be formed of the lens groups having f-θ characteristics viewed from the stop side, and one of the lens groups may be the angularly deviatable lens group for turning the image plane. In this case, the f-θ lens group can establish a proportional relationship between the angle of incident rays from the stop side and the image height, so that change in angle of the rays at the stop side does not change the relationship of the image height corresponding to the same. This can suppress change in the magnification of the image height, even when an angular deviation of any one of the f-θ lens groups is performed, and thus the trapezoidal distortion due to turn of the image plane can be suppressed. Particularly, the trapezoidal distortion can be substantially suppressed by the angular deviation of the lens group turning around the stop position. In this optical system, by simple motion of the lens group, i.e., by turning the f-θ lens group around the stop position, the image plane can be turned while maintaining constant conditions for compensating the aberration such as trapezoidal distortion, the curvature of field and the comatic aberration. Further, the distortion in the image plane can be removed in the optimum manner on a straight line at which a plane containing this turning direction (i.e., symmetry plane of all the lens systems defined when angularly deviating the lens groups) intersect the image plane, and this is particularly effective for obtaining a linear image without a distortion, as is desired, e.g., in a scan lens system.

When the angularly deviatable lens group is employed for turning the image plane, this lens group may be an afocal lens group. It has been known with respect to the afocal lens group that the output image plane is inclined at an angle equal to the inclination angle of the input image plane multiplied by the magnification of the afocal lens group, when the input imaoptical is inclined with respect to the optical axis of the afocal lens group. This is a distinctive feature of the afocal system. In the structure in which the afocal lens group is employed for turning the image plane as described above, the image plane can be turned with a simple structure by utilizing the characteristics of the afocal system. The center of turn of the afocal lens group for image turning may be located at the pupil position determined by viewing the lens group between the afocal lens group and the object plane from the side of the afocal lens group, whereby the pupil of the incident rays with respect to the afocal lens group does not move, even when the afocal lens group is turned. Therefore, it is possible to suppress variation in comatic aberration and distortion aberration in the coaxial system, and thus a good projection performance can be maintained.

In the projection optical system described above, parallel displacement of the center of the image plane occurs when the object plane or image plane turns. In order to prevent this, such a structure may be employed that parallel displacement of the object plane is carried out in accordance with turn of the lens group provided for turning the object plane or image plane. This structure can prevent displacement of the image plane center.

Figure 9:
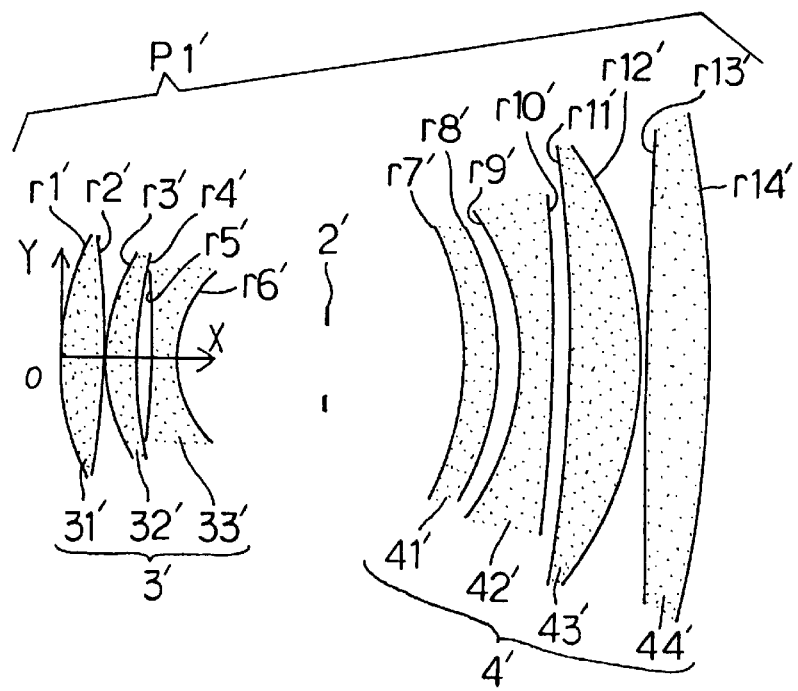
FIG. 9 is a schematic cross section showing lens groups in a projection optical system of a projection optical device according to still another embodiment of the invention.

FIGS. 9 to 12 relate to a projection optical device of a still another embodiment of the invention. FIG. 9 is a cross section of lens groups in a projection optical system of the projection optical device. FIGS. 10(A), 10(B) and 10(C) each show a schematic structure of the projection optical device having the projection optical system and a light path in the same.

As shown in FIGS. 9, 10(A), 10(B) and 10(C), the projection optical device includes an image display device 1' which provides an object plane 10' to be magnified and projected, a projection optical system P1' and a screen 5' on which a final image plane 50' is to be formed.

The object plane 10' in this embodiment is a square object plane (grid pattern) having sides, each of which is 40 mm in length. The projection optical system P1' includes an stop 2' as well as lens groups 3' and 4' arranged at opposite sides of the stop 2'.

The lens group 3' relatively near the object plane 10' and the lens group 4' relatively near the image plane 50' are f-θ lens groups. With respect to the lens group 3', an object height at the display device 1' (i.e., position of an object point in the object plane 10' on the image display device 1') is proportional to an outgoing angle (i.e., an angle between outgoing ray and the optical axis of the lens group 3') at the stop side. The lens group 4' is arranged such that an image height at the image plane side (i.e., a position of an image point in the final image plane 50') is proportional to an incident angle (an angle of the incident ray to the optical axis of the lens group 4'). The lens group 4' is angularly deviatable around a center of incident rays.

Thus, the lens group 4' can be angularly deviated together with the stop 2' around an axis, which is parallel to a Z-axis to be described later and extends through an intersection between a plane containing the stop 2' and the optical axis of the lens group 4' (here, the center of the stop 2 because the aperture of the stop is circular), by simple and inexpensive drive means (not shown), and thereby the image plane 50' can be turned.

The screen 5' can be turned together with the lens group 4' around the center of the stop while maintaining a constant position relationship to the lens group 4', so that the inclination angle can be changed.

Specifications of the lens groups 3' and 4' as well as the object plane 10' and the image plane 50' are shown in a table 5. In the table 5, "r1' . . . r6', r7' . . . r14'" represent the lens surfaces of lenses 31'–33' and 41'–44'" as shown in FIG. 9, and "radius of curvature" represents radii (mm) of curvatures of the respective lens surfaces. In this table, a convex surface in a light advancing direction is represented by a "positive value", and a concave surface is represented by a "negative value". The "axial distance" represents distances (mm) along the optical axis between adjacent lens surfaces as well as between the lens and the stop. The "refractive index" represents refractive indexes of substances between the adjacent lens surfaces (or substance behind the final lens surfaces) as well as between the lens surface and the stop. The refractive index of 1.00000 represents that no lens exists and the substance is air.

Each of the surfaces of the stop near and remote from the object plane has an infinite radius of curvature (∞), which is also represented in the table 5 together with the radius (mm) of the aperture of the stop.

In the table 5, numerical values of X, Y and Z in sections of "Lens Group 3'", "Lens Group 4'", "Object Plane 10'" and "Image Plane 50'" represent coordinate positions (X, Y, Z). More specifically, the numerical values of X, Y and Z in the section of "Lens Group 3'" represents the position of the surface apex of the lens surface r1' nearest to the object plane. The values of X, Y and Z in the section of "Lens Group 4'" represents the position of the center of the stop 2'. The values of X, Y and Z in the sections of "Object Plane 10'" and "Image Plane 50'" represent the positions of the centers of the object plane 10' and image plane 50', respectively. In this embodiment as well as an embodiment to be described later, the X-axis in (X, Y, Z) coordinate extends along an optical axis (positive in the light advancing direction) of the lens nearest to the object plane 10' from the surface apex of the same lens (e.g., the apex of the surface r1' of the lens 31' in FIG. 9). The Y-axis is a longitudinal axis perpendicular to the X-axis. The Z-axis is perpendicular to both the X- and Y-axes (here, to a sheet of the drawing). The "ANG" represents angles (degrees) of angular deviation of the lens groups 3' and 4' and the stop 2' with respect to the X-axis, and also represents inclination angles of the object plane and image plane with respect to the X-axis. Throughout the table 5, "positive" represents a clockwise direction in the figure.

In the section of the object plane, ymax and ymin represent areas of the object plane in the Y-axis direction, and zmax and zmin represent areas of the object plane in the Z-axis direction.

In the Table 5, ANGs (inclination angles) of lens group 4' and image plane 50' (screen 5') are 0° (state in FIG. 10(A)), but can be changed, e.g., into 10° or 20° by angularly deviating the lens group 4' and screen 5' as shown in the following table 6 and FIGS. 10(B) and 10(C).

In the table 6, "grp.4' ANG" represents an angular deviation angle of the lens group 4'. "IMG.X", "IMG.Y" and "IMG.Z" represent (X, Y, Z) coordinate positions of the center of the image plane 50' corresponding to the deviation angle of the lens group 4'. "IMG.ANG" represents an inclination angle (image plane angle) of the image plane 50' (screen 5').

TABLE 5

| Lens Group 3' | | | | | |
|---|---|---|---|---|---|
| X | Y | Z | ANG | | |
| 0.00000 | 0.00000 | 0.00000 | 0.00000 | | |
| radius of curvature | | | | axial distance | refractive index |
| r1' | 80.622 | | | | |
| | | | | 12.702 | 1.76500 |
| r2' | −207.716 | | | | |
| | | | | 0.544 | 1.00000 |
| r3' | 57.486 | | | | |
| | | | | 9.073 | 1.76500 |
| r4' | 137.219 | | | | |
| | | | | 4.536 | 1.00000 |
| r5' | −227.078 | | | | |
| | | | | 7.349 | 1.51100 |
| r6' | 33.679 | | | | |
| | | | | 0.000 | 1.00000 |
| Lens Group 4' | | | | | |
| X | Y | Z | ANG | | |
| 77.754 | 0.00000 | 0.00000 | 0.00000 | | |
| radius of curvature | | | | axial distance | refractive index |
| Stop 2' | ∞ (radius of aperture of stop 10.000 ) | | | | |
| | | | | 39.982 | 1.00000 |
| r7' | −90.695 | | | | |
| | | | | 9.796 | 1.75600 |
| r8' | −82.199 | | | | |
| | | | | 6.357 | 1.00000 |
| r9' | −77.101 | | | | |
| | | | | 9.596 | 1.75600 |
| r10' | −469.473 | | | | |
| | | | | 4.878 | 1.00000 |
| r11' | −415.372 | | | | |
| | | | | 20.991 | 1.75600 |
| r12' | −107.691 | | | | |
| | | | | 1.639 | 1.00000 |
| r13' | 2557.741 | | | | |
| | | | | 18.751 | 1.75600 |
| r14' | −349.002 | | | | |
| | | | | 0.000 | 1.00000 |
| Object Plane 10' | | | | | |
| X | Y | Z | ANG | | |
| −129.700 | 0.00000 | 0.00000 | 0.00000 | | |
| | ymax | ymin | zmax | zmin | |
| | 20.0000 | −20.0000 | 20.0000 | −20.0000 | |
| Image Plane 50' | | | | | |
| X | Y | Z | ANG | | |
| 683.583 | 0.00000 | 0.00000 | 0.00000 | | |

TABLE 6

| Inclination Angle of Image Plane | grp4'.ANG | IMG.X | IMG.Y | IMG.Z | IMG.ANG |
|---|---|---|---|---|---|
| 0° | 0.000 | 683.583 | 0.000 | 0.000 | 0.000 |
| 10° | −10.000 | 686.632 | 35.726 | 0.000 | −10.000 |
| 20° | −20.000 | 696.861 | 70.367 | 0.000 | −20.000 |

The following table 7 represents distortion ratios at the final image plane 50'.

In the table 7, the "object height" represents distances (mm) in the Y-axis direction and Z-axis direction to the object point from the origin defined by a point at which the X-axis intersects the object plane 10'. The "image height" is determined as follows. The origin is defined by a point at which a ray from the object plane center (0, 0) intersects the image plane 50'. Line at which X-Y plane intersects the image plane 50' is defined as a y-axis (a direction of the Y-axis positive direction projected on the image plane 50' represents the positive direction). An axis perpendicular to the y-axis is defined as a z-axis (the front side of the sheet of the drawing represents a positive area). Based on the above definition, the "image height" is determined on the (y, z) coordinate. An ideal image height is represented as (y, z). The image height including a distortion is represented as (y+dy, z+dz). dy/r represents a distortion ratio in the y-axis direction, and dz/r represents a distortion ratio in the z-axis direction. "r" can be represented as $r=(y^2+z^2)^{1/2}$. The image height having the distortion which is used for obtaining the distortion ratio is determined by center-of-gravity points in spot diagrams for respective image heights. The spot diagrams for object points of the respective object heights are shown in FIGS. 11(A) to 11(C). Projected images on the screen 5' are shown in FIGS. 12(A) to 12(C).

TABLE 7

| Object Height [mm] | Inclination Angle of Image Plane | | | | | |
|---|---|---|---|---|---|---|
| | 0° dy/r | 0° dz/r | 10° dy/r | 10° dz/r | 20° dy/r | 20° dz/r |
| ( 20, 0) | −0.0050 | 0.0000 | −0.0060 | 0.0000 | −0.0005 | 0.0000 |
| (−20, 0) | 0.0050 | 0.0000 | 0.0048 | 0.0000 | 0.0060 | 0.0000 |
| ( 20,20) | −0.0077 | −0.0077 | 0.0007 | −0.0198 | 0.0155 | −0.0379 |
| ( 0,20) | 0.0000 | −0.0050 | 0.0115 | −0.0103 | 0.0240 | −0.0259 |
| (−20,20) | 0.0077 | −0.0077 | 0.0157 | 0.0026 | 0.0246 | −0.0051 |

From the distortion ratios shown in the table 7 and FIGS. 12(A) to 12(C), it can be understood that the projection optical device can provide a final projected image in which the trapezoidal distortion and distortion aberration are sufficiently compensated.

It can also be seen that the state of compensation can be maintained substantially constant even when the lens group 4' is angularly deviated in accordance with inclination of the screen 5'. Further, it can be seen from FIGS. 12(A) to 12(C) that the magnification can be maintained substantially constant.

A projection optical device of yet another embodiment of the invention will be described below with reference to FIGS. 13 to 16(B).

Figure 13:
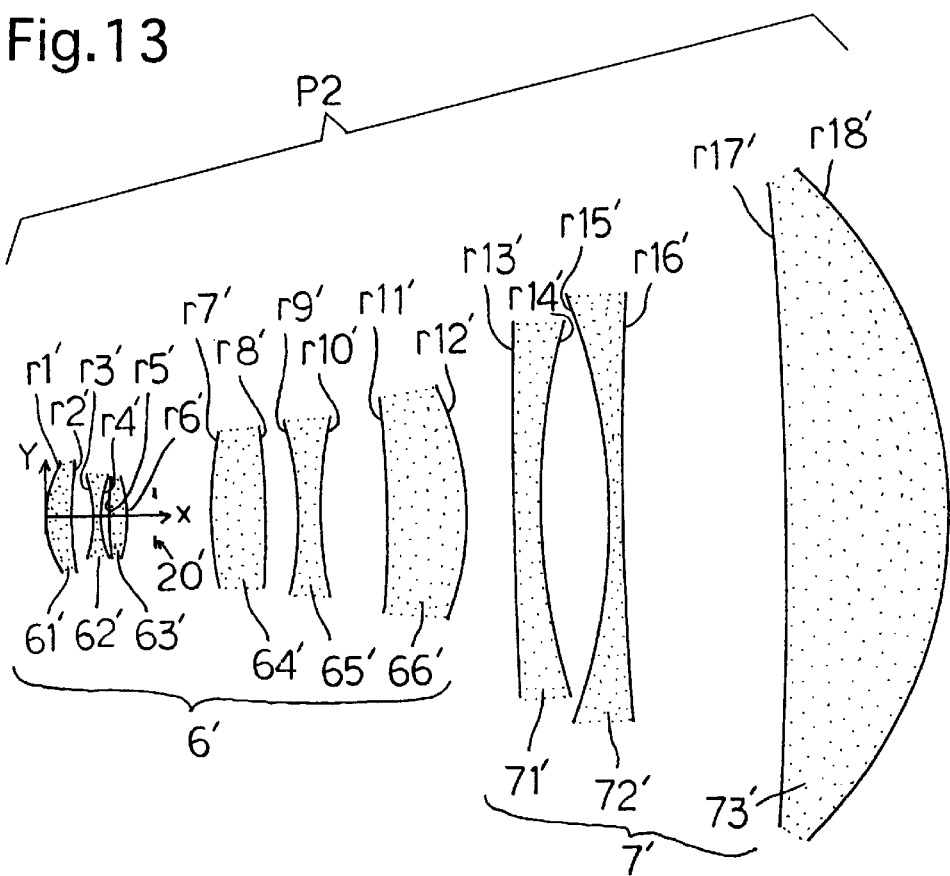
FIG. 13 is a cross section showing lens groups in a projection optical system of a projection optical device according to yet another embodiment of the invention.
Figure 14A:
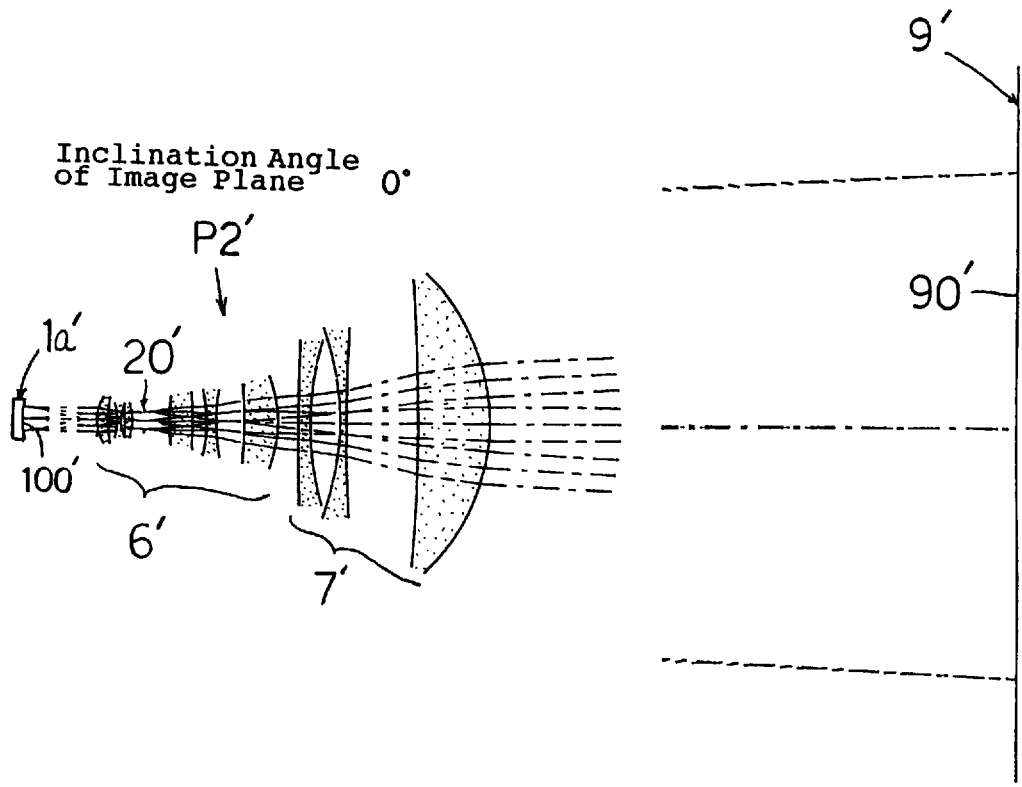
FIGS. 14(A) and 14(B) each show the schematic structure of the projection optical device having the projection optical system shown in FIG. 13 and a light path in the same, and particularly show cases in which an inclination angle of an image plane is 0° and 6.687°, respectively.
Figure 14B:
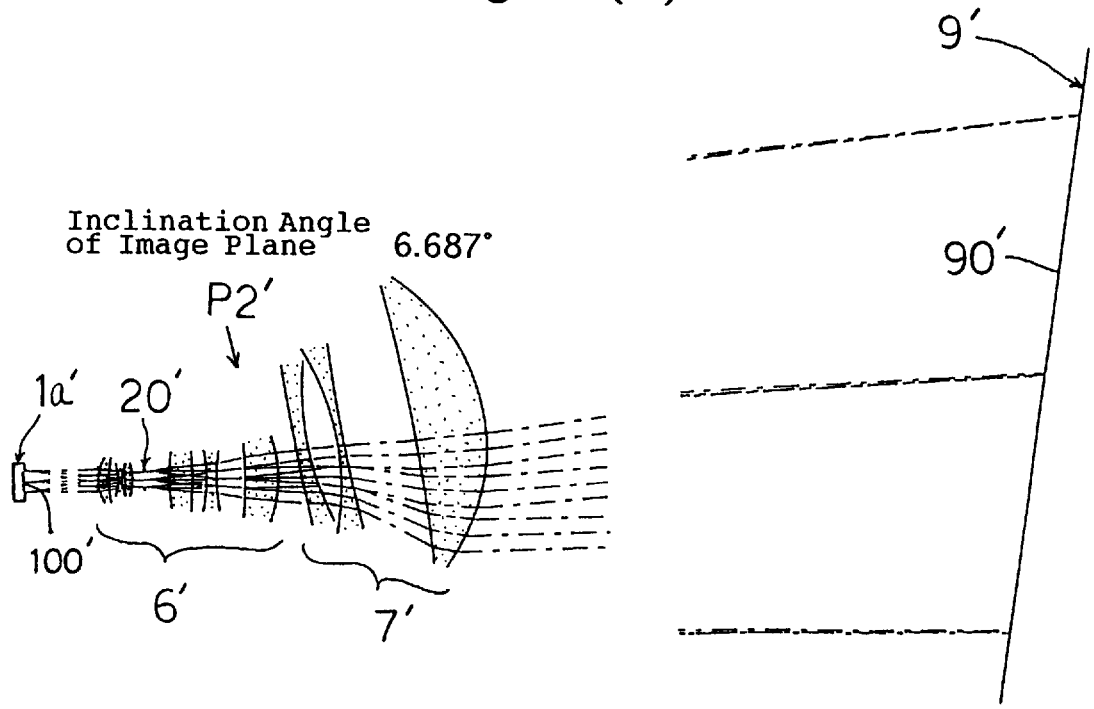

FIG. 13 is a schematic cross section of lens groups in a projection optical system of the projection optical device. FIGS. 14(A) and 14(B) each show a schematic structure of the projection optical device having the projection optical system and a light path in the same.

Similarly to the device already described, the projection optical device includes an image display device 1a' which provides an object plane 100' to be projected, a projection optical system P2' and a screen 9' on which a final image plane 90' is to be formed.

The object plane 100' is a square object plane (grid pattern) having sides, each of which is 20 mm in length. The projection optical system P2' includes a stop 20' as well as lens groups 6' which is formed of lenses arranged at opposite sides of the stop, and further includes a lens group 7' arranged between the lens group 6' and the screen 9'.

The lens group 7' is an afocal lens group, and can be angularly deviated around the pupil position viewed from the same lens group by simple and inexpensive drive means (not shown), and thereby the image plane 90' can be turned.

The screen 9' can be inclined by unillustrated drive means.

Specifications of the lens groups 6' and 7' as well as the object plane 100' and the image plane 90' are shown in the table 8 similar to the table 5.

In the table 8, "r1' . . . r6', r7' . . . r12', r13' . . . r18'" represent the lens surfaces of lenses 61'–63', 64'–66' and 71'–73' as shown in FIG. 13. The stop 20' has an infinite radius of curvature (∞), which is also represented in the table 8 together with the radius (mm) of the aperture of the stop.

In the table 8, numerical values of X, Y and Z in sections of "Lens Group 6' and 7'", "Object plane 100'" and "Image plane 90'" represent coordinate positions (X, Y, Z) of apexes of the surfaces r1' and r13' of the lenses 61' and 71' in the lens groups 6' and 7' as well as coordinate positions (X, Y, Z) of centers of the object plane 100' and image plane 90'. The "ANG" represents angles (degrees) of inclination of the lens group 6' and 7' with respect to the X-axis, and also represents inclination angles of the object plane 100' and image plane 90' with respect to the X-axis.

In the section of the object plane, ymax and ymin represent areas of the object plane in the Y-axis direction, and zmax and zmin represent areas of the object plane in the Z-axis direction.

In the Table 8, ANGs (inclination angles) of lens group 7' and image plane 90' (screen 9') are 0° (state in FIG. 14(A)), but can be changed, e.g., into 6.687° by angularly deviating the lens group 7' as shown in the following table 9 and FIG. 14(B).

In the table 9, "grp.7' ANG" represents an angular deviation angle of the lens group 7'. "IMG.X", "IMG.Y" and "IMG.Z" represent (X, Y, Z) coordinate positions of the center of the image plane 90' corresponding to the deviation angle of the lens group 7'. "IMG.ANG" represents an inclination angle (image plane angle) of the image plane 90' (screen 9').

TABLE 8

Lens Group 6'

| | X | Y | Z | ANG | |
|---|---|---|---|---|---|
| | 0.00000 | 0.00000 | 0.00000 | 0.00000 | |
| | radius of curvature | | | axial distance | refractive index |
| r1' | 36.045 | | | | |
| | | | | 9.500 | 1.70000 |
| r2' | 118.267 | | | | |
| | | | | 8.000 | 1.00000 |
| r3' | −46.391 | | | | |
| | | | | 2.780 | 1.57800 |
| r4' | 40.574 | | | | |
| | | | | 3.000 | 1.00000 |
| r5' | 124.230 | | | | |
| | | | | 6.630 | 1.70800 |
| r6' | −46.972 | | | | |
| | | | | 9.540 | 1.00000 |
| Stop 20' | ∞ (radius of aperture of stop 7.00000) | | | | |
| | | | | 19.400 | 1.00000 |
| r7' | 148.242 | | | | |
| | | | | 19.890 | 1.70800 |
| r8' | −307.921 | | | | |
| | | | | 12.000 | 1.00000 |
| r9' | −120.049 | | | | |
| | | | | 8.3400 | 1.57800 |
| r10' | 161.098 | | | | |
| | | | | 24.000 | 1.00000 |
| r11' | −423.472 | | | | |
| | | | | 28.500 | 1.70000 |
| r12' | −109.096 | | | | |
| | | | | — | 1.00000 |

Lens Group 7'

| | X | Y | Z | ANG | |
|---|---|---|---|---|---|
| | 20.0000 | 0.00000 | 0.00000 | 0.0000 | |
| | radius of curvature | | | axial distance | refractive index |
| | | | | 150.000 | 1.00000 |
| r13' | 2487.853 | | | | |

TABLE 8-continued

| | | | | | |
|---|---|---|---|---|---|
| | | | | 10.000 | 1.70000 |
| r14' | 254.693 | | | | |
| | | | | 25.000 | 1.00000 |
| r15' | −225.611 | | | | |
| | | | | 5.000 | 1.70000 |
| r16' | 1357.448 | | | | |
| | | | | 60.000 | 1.00000 |
| r17' | −1616.694 | | | | |
| | | | | 60.000 | 1.70000 |
| r18' | −171.560 | | | | |
| | | | | 0.000 | 1.00000 |

Object Plane 100'

| X | Y | Z | ANG |
|---|---|---|---|
| −60.700 | 0.000 | 0.000 | 0.000 |
| | ymax | ymin | zmax | zmin |
| | 10.0000 | −10.0000 | 10.0000 | −10.0000 |

Image Plane 90'

| X | Y | Z | ANG |
|---|---|---|---|
| 3634.560 | 0.000 | 0.00000 | 0.000 |

TABLE 9

| Inclination Angle of Image Plane | grp7'.ANG | IMG.X | IMG.Y | IMG.Z | IMG.ANG |
|---|---|---|---|---|---|
| 0° | 0.000 | 3634.560 | 0.000 | 0.000 | 0.000 |
| 6.687° | −10.000 | 3590.690 | 216.520 | 0.000 | 6.687 |

The following table 10 represents distortion ratios at the final image plane 90'.

Figure 15B:
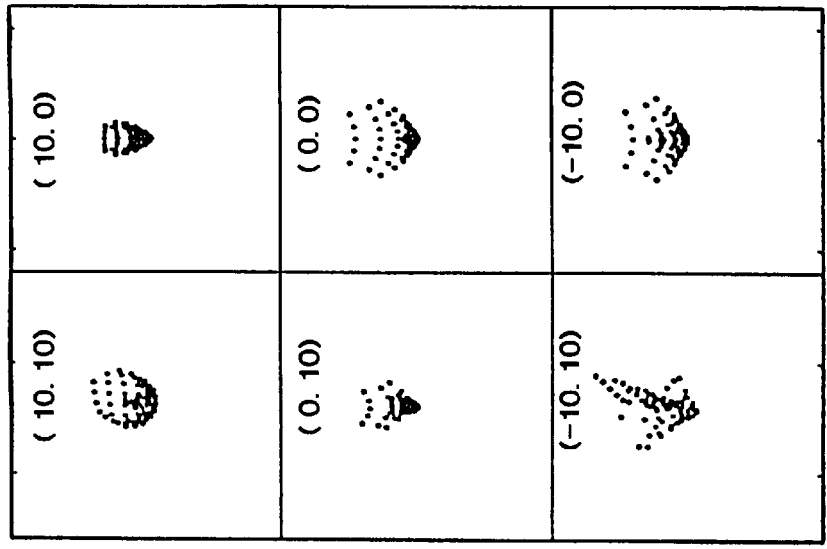
FIGS. 15(A) and 15(B) show spots at an image plane on a screen which are defined by rays from an object point on an object plane in the device shown in FIGS. 14(A) and 14(B), and particularly show cases in which an inclination angle of an image plane is 0° and 6.687°, respectively.
Figure 15A:
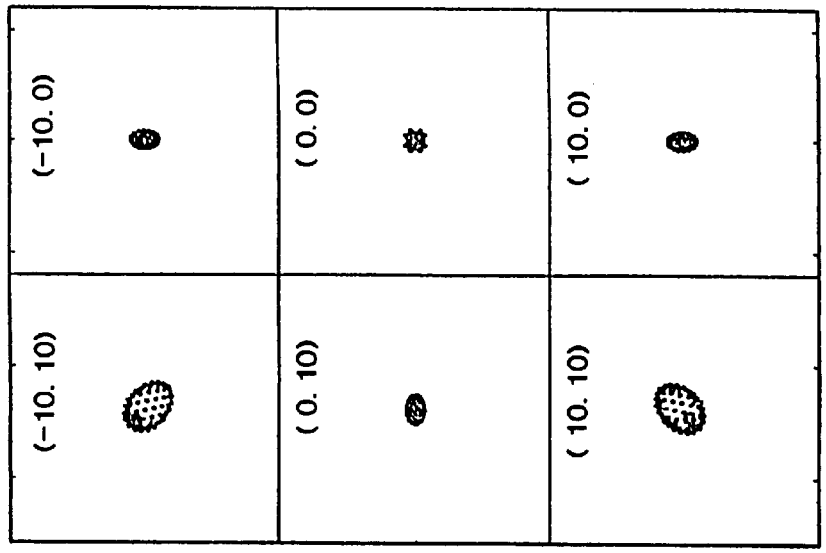

The spot diagrams for object points of the respective object heights are shown in FIGS. 15(A) and 15(B). Projected images on the screen 9' are shown in FIGS. 16(A) 16(B).

TABLE 10

| | Inclination Angle of Image Plane | | | |
|---|---|---|---|---|
| | 0° | | 6.687° | |
| Object Height[mm] | dy/r | dz/r | dy/r | dz/r |
| ( 10, 0) | −0.0009 | 0.0000 | −0.0484 | 0.0000 |
| (−10, 0) | 0.0009 | 0.0000 | 0.0359 | 0.0000 |
| ( 10,10) | −0.0013 | −0.0013 | −0.0343 | −0.0067 |
| (  0,10) | 0.0000 | −0.0009 | −0.0026 | −0.0057 |
| (−10,10) | 0.0013 | −0.0013 | 0.0244 | 0.0012 |

Figure 16B:
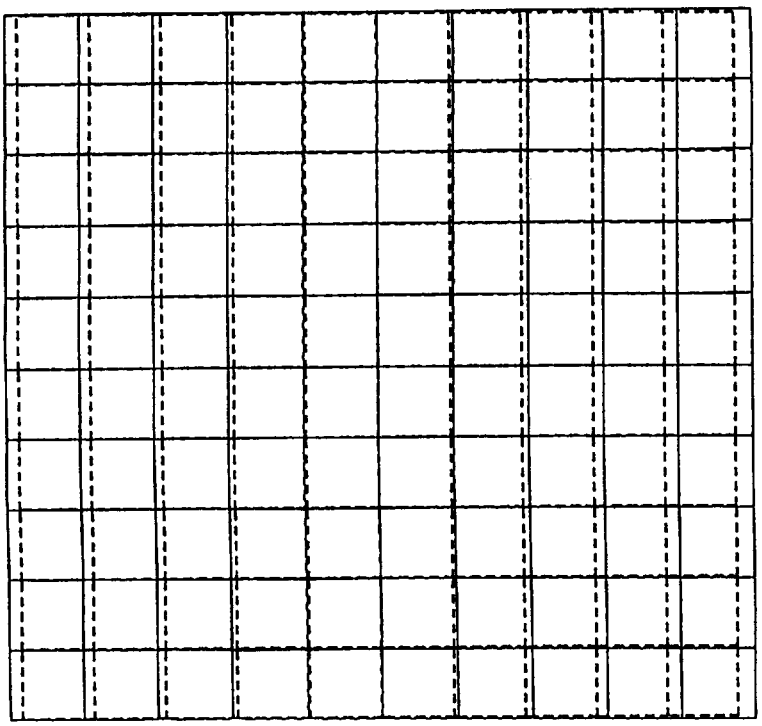
FIGS. 16(A) and 16(B) each show a projected image with a distortion of a square object plane (grid pattern) on a screen (which is represented by solid line) and an ideal image without a distortion (which is represented by broken line), and particularly show cases in which an inclination angle of an image plane is 0° and 6.687°, respectively.
Figure 16A:
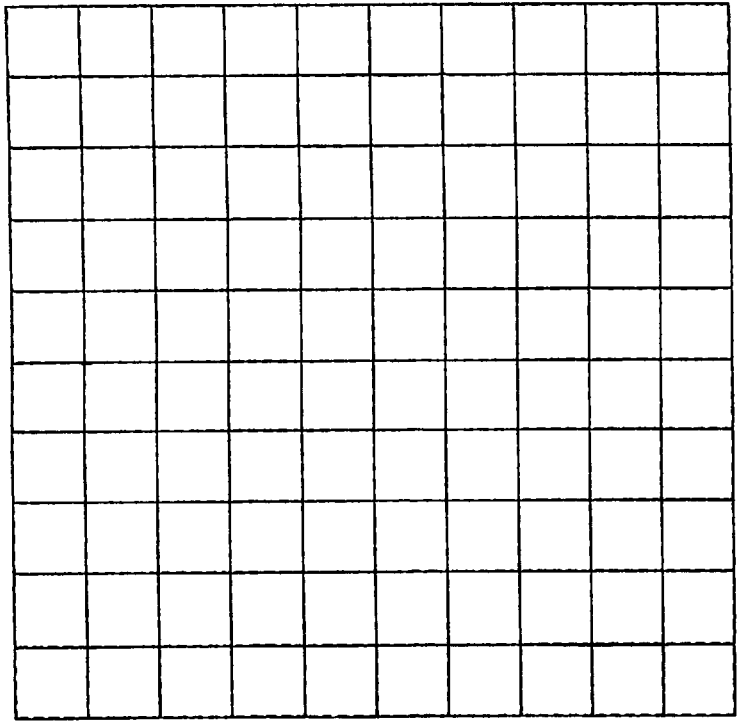

From the distortion ratios shown in the table 10 and FIGS. 16(A) and 16(B), it can be understood that the projection optical device can provide a final projected image in which the trapezoidal distortion and distortion aberration are sufficiently compensated.

It can also be seen that the state of compensation can be maintained substantially constant even when the lens group 7' is angularly deviated in accordance with inclination of the screen 9'. Further, it can be seen from FIGS. 16(A) and 16(B) that the magnification can be maintained substantially constant.

Figure 10A:
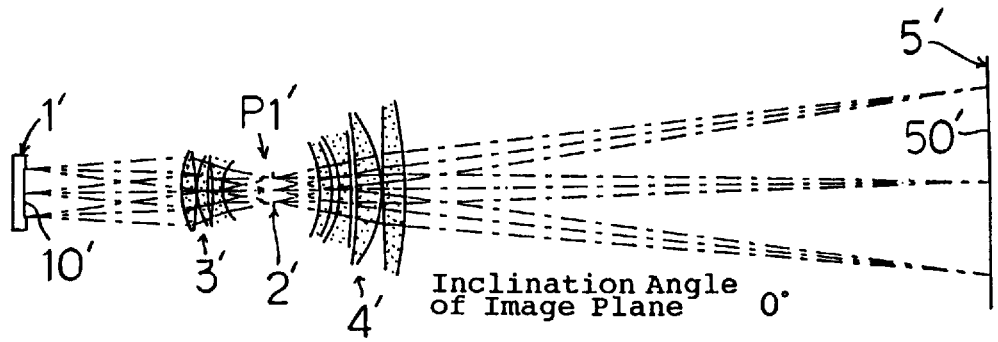
FIGS. 10(A), 10(B) and 10(C) each show the schematic structure of the projection optical device having the projection optical system shown in FIG. 9 and a light path in the same, and particularly show cases in which an inclination angle of an image plane is 0°, 10° and 20°, respectively.
Figure 10B:
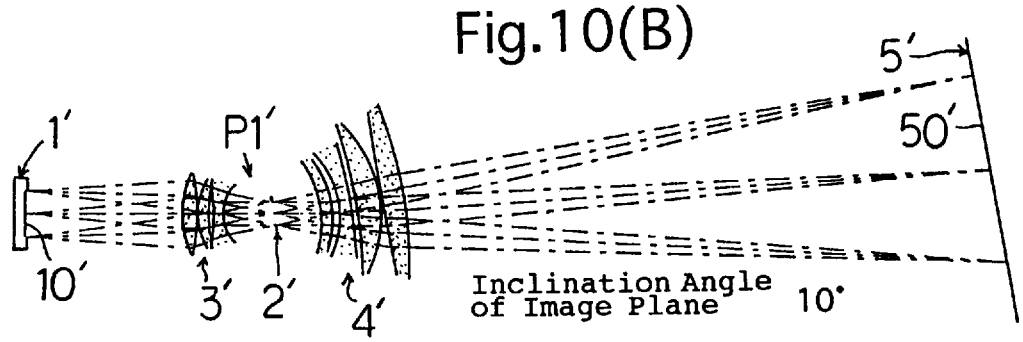
Figure 10C:
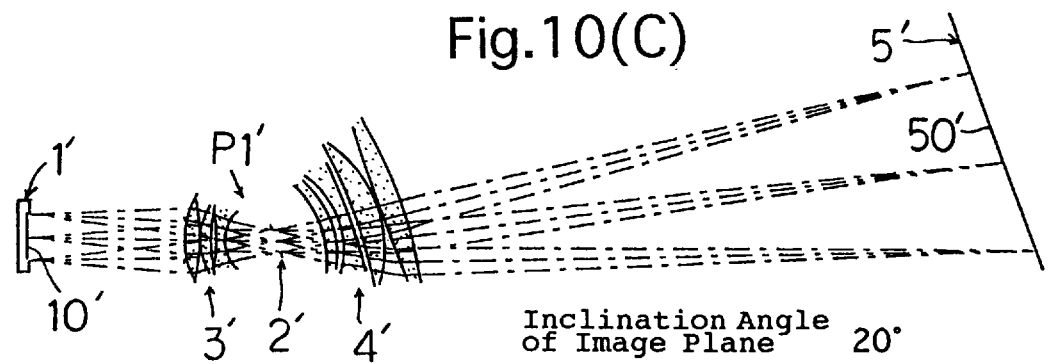
Figure 17A:
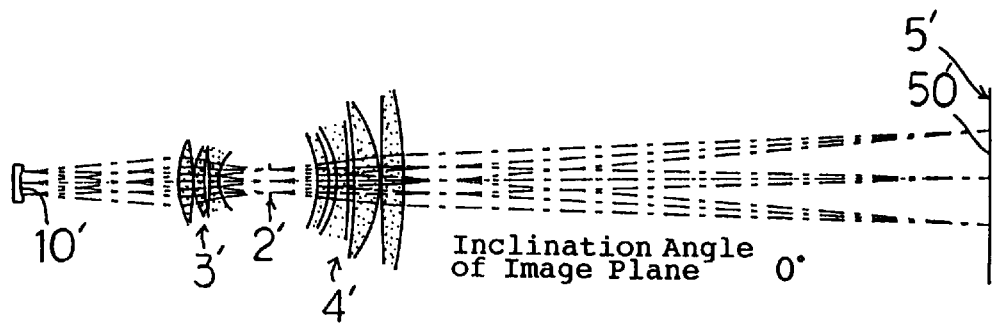
FIGS. 17(A), 17(B) and 17(C) show examples in which parallel displacement of an object plane is performed in accordance with turn of an image plane in the projection optical device shown in FIGS. 10(A), 10(B) and 10(C), and particularly show cases in which an inclination angle of an image plane is 0°, 10° and 20°, respectively.
Figure 17B:
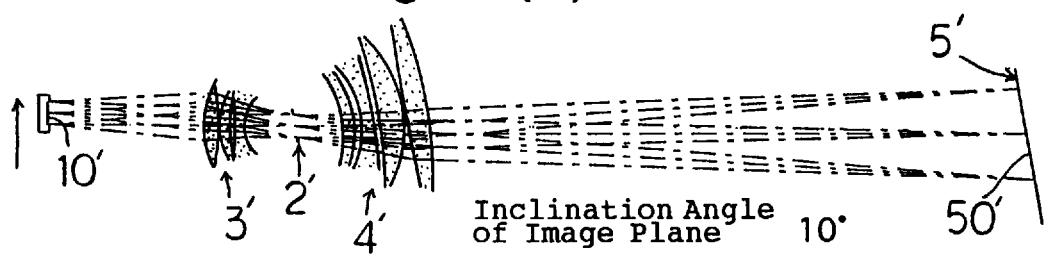
Figure 17C:
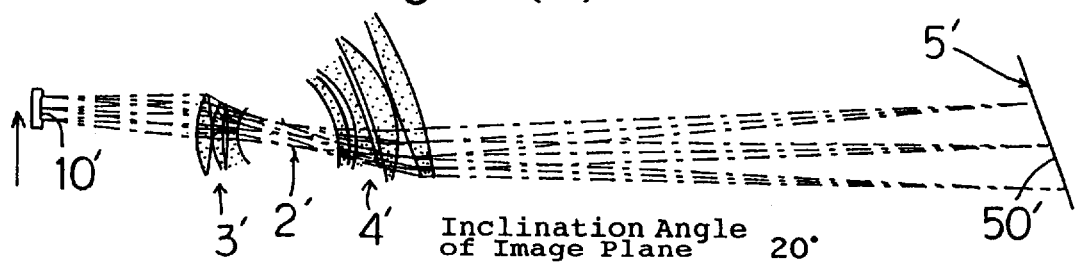

FIGS. 17(A) to 17(C) shows a projection optical device, in which parallel displacement of the object plane 10' can be performed by unillustrated drive means in accordance with inclination of the image plane, whereby movement of the image center position due to inclination of the image plane can be suppressed in the projection optical device shown in FIGS. 10(A) to 10(C). The optical system P1' includes the same stop and lens groups as those shown in FIG. 9. By the parallel displacement of the center of the object plane 10', e.g., shown in a following table 11, displacement of the center of the image plane can be suppressed. In the table 11, "OBJ.Y" represents an amount of parallel displacement of the object plane 10' in the Y-axis direction.

TABLE 11

| Inclination Angle of Image Plane | grp4'.ANG | IMG.X | IMG.Y | IMG.Z | IMG.ANG | OBJ.Y |
|---|---|---|---|---|---|---|
| 0° | 0.000 | 683.583 | 0.000 | 0.000 | 0.000 | 0.000 |
| 10° | −10.000 | 686.632 | 35.726 | 0.000 | −10.000 | 10.000 |
| 20° | −20.000 | 696.861 | 70.367 | 0.000 | −20.000 | 20.000 |

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A projection optical device comprising a projection optical system for projecting an image of an object plane onto a screen without forming an intermediate real image, wherein said projection optical system includes a coaxial first lens group to be arranged relatively near the object plane, a coaxial second lens group to be arranged relatively near said screen, and a stop arranged between said first and second lens groups, said second lens group has an optical axis inclined with respect to an optical axis of said first lens group, and a magnification $\beta 1$ of said first lens group satisfies a relationship of $|1/\beta 1|<0.05$.

2. The projection optical device according to claim 1, wherein said second lens group is angularly deviated from said first lens group around a position of said stop.

3. The projection optical device according to claim 1, wherein said first lens group is a lens group having f-θ characteristics viewed from the stop side.

4. The projection optical device according to claim 1, wherein said second lens group is a lens group having f-θ characteristics viewed from the stop side.

5. The projection optical device according to claim 1, further comprising a third lens group partially having a coaxial lens group and to be arranged between said second lens group and said screen, and wherein an angle θ between an optical axis of said partial lens group and an image plane satisfies the condition of $|\theta|<5°$.

6. The projection optical device according to claim 1, wherein said second lens group is angularly deviatable around a position of said stop.

7. A projection optical device for projecting an image of an object plane onto a screen without forming an intermediate real image, comprising:

information providing means for providing information to the object plane;

a coaxial first lens group to be arranged relatively near the object plane;

a coaxial second lens group to be arranged relatively near the screen and having an optical axis inclined with respect to an optical axis of said first lens group;

a stop arranged between said first and second lens groups; and said screen onto which the information on the object plane provided by said information providing means is projected, a magnification $\beta 1$ of said first lens group satisfying a relationship of $|1/\beta 1|<0.05$.

8. The projection optical device according to claim 7, wherein said second lens group is angularly deviated from said first lens group around a position of said stop.

9. The projection optical device according to claim 7, wherein said first lens group is a lens group having f-θ characteristics viewed from the stop side.

10. The projection optical device according to claim 7, wherein said second lens group is a lens group having f-θ characteristics viewed from the stop side.

11. The projection optical device according to claim 7, further comprising a third lens group partially having a coaxial lens group and to be arranged between said second lens group and said screen, and wherein an angle θ between an optical axis of said partial lens group and an image plane satisfies the condition of $|\theta|<5°$.

12. The projection optical device according to claim 7, wherein said second lens group is angularly deviatable around a position of said stop.

13. A projection optical device having a projection optical system for projecting an image of an object plane onto a screen, said projection optical system comprising, from the object plane side:

a first lens group to be arranged relatively near the object plane;

a second lens group to be arranged relatively near the screen; and a stop arranged between said first and second lens groups, wherein at least one of said first and second lens groups is angularly deviatable, and wherein said angularly deviatable lens group is operable to turn for turning one of an image plane and the object plane while maintaining a constant distortion of the image plane.

14. The projection optical device according to claim 13, wherein said angularly deviatable lens group is a lens group for turning the image plane, and a center of said turn is at an image position of said stop viewed from said angularly deviatable lens group.

15. The projection optical device according to claim 13, wherein said angularly deviatable lens group is a lens group adjacent to said stop for turning the image plane, and a center of said turn is substantially at a position of said stop.

16. The projection optical device according to claim 13, wherein said angularly deviatable lens group is a lens group for turning the image plane, and has f-θ characteristics.

17. The projection optical device according to claim 13, wherein said lens groups relatively near the object plane and the screen each have f-θ characteristics viewed from the stop side.

18. The projection optical device according to claim 13, wherein said angularly deviatable lens group is a lens group for turning the image plane, and forms an afocal optical system.

19. A projection optical device for projecting an image of an object plane onto a screen, comprising:

information providing means for providing information to the object plane;

a first lens group to be arranged relatively near the object plane;

a second lens group to be arranged relatively near the screen;

a stop arranged between said first and second lens groups; and wherein said screen onto which the information on the object plane provided by said information providing means is projected, and at least one of said first and second lens groups is angularly deviatable, and said angularly deviatable lens group being operable to turn for turning one of an image plane and the object plane while maintaining a constant distortion.

20. The projection optical device according to claim 19, wherein parallel displacement of said object plane can be performed.

* * * * *